United States Patent [19]
Garretson

[11] Patent Number: 5,887,609
[45] Date of Patent: Mar. 30, 1999

[54] CONTAINER HAVING FLUID-WEIGHT CONTROL DEVICE

[76] Inventor: Owen L. Garretson, P.O. Box 108, Farmington, N. Mex. 87499

[21] Appl. No.: 804,132

[22] Filed: Feb. 20, 1997

Related U.S. Application Data

[63] Continuation-in-part of Ser. No. 755,292, Nov. 22, 1996.

[51] Int. Cl.⁶ .......................... F16K 31/24; F16K 31/26; F16K 31/34
[52] U.S. Cl. .............................. 137/2; 137/403; 137/413; 137/414; 137/449; 141/198
[58] Field of Search ................ 137/2, 403, 413, 137/414, 434, 449; 141/198

[56] References Cited

U.S. PATENT DOCUMENTS

| | | | |
|---|---|---|---|
| 2,731,030 | 1/1956 | Phillips et al. | 137/413 |
| 3,055,386 | 9/1962 | Moore | 137/403 |
| 3,749,141 | 7/1973 | Garretson | 137/512.3 |
| 3,929,155 | 12/1975 | Garretson | 137/430 |
| 4,305,422 | 12/1981 | Bannink | 137/449 |
| 4,444,230 | 4/1984 | Van Mullem | 137/449 |
| 4,635,480 | 1/1987 | Hrncir et al. | 137/416 |
| 5,460,197 | 10/1995 | Kerger et al. | 137/413 |

*Primary Examiner*—George L. Walton
*Attorney, Agent, or Firm*—Lathrop & Gage, L.C.

[57] ABSTRACT

A device, and a container having such a device, is provided for permitting filling the container with a predetermined weight of the fluid. The device and container include a main channel to introduce the fluid into the container at a fill pressure; a detector mechanism to detect a "filled" condition based on fluid weight; and a fluid-weight control mechanism to automatically prevent introducing fluid into the container in excess of the "filled" condition. A spring offsets part of the weight of a pivotally mounted displacer mounted on a pivotally mounted lever having an arm configured to permit closure of a ball valve as the container becomes "filled" and the displacer becomes buoyant. The fluid-weight control device, which is substantially independent of the composition and temperature of the fluid and of inertial effects induced in an attempt to thwart the fluid-weight control safeguard, also prevents introduction of fluid into the container as the container is non-upright. A modified embodiment utilizes a pilot valve arrangement in conjunction with the ball valve. A method of practicing the invention is also provided.

17 Claims, 7 Drawing Sheets

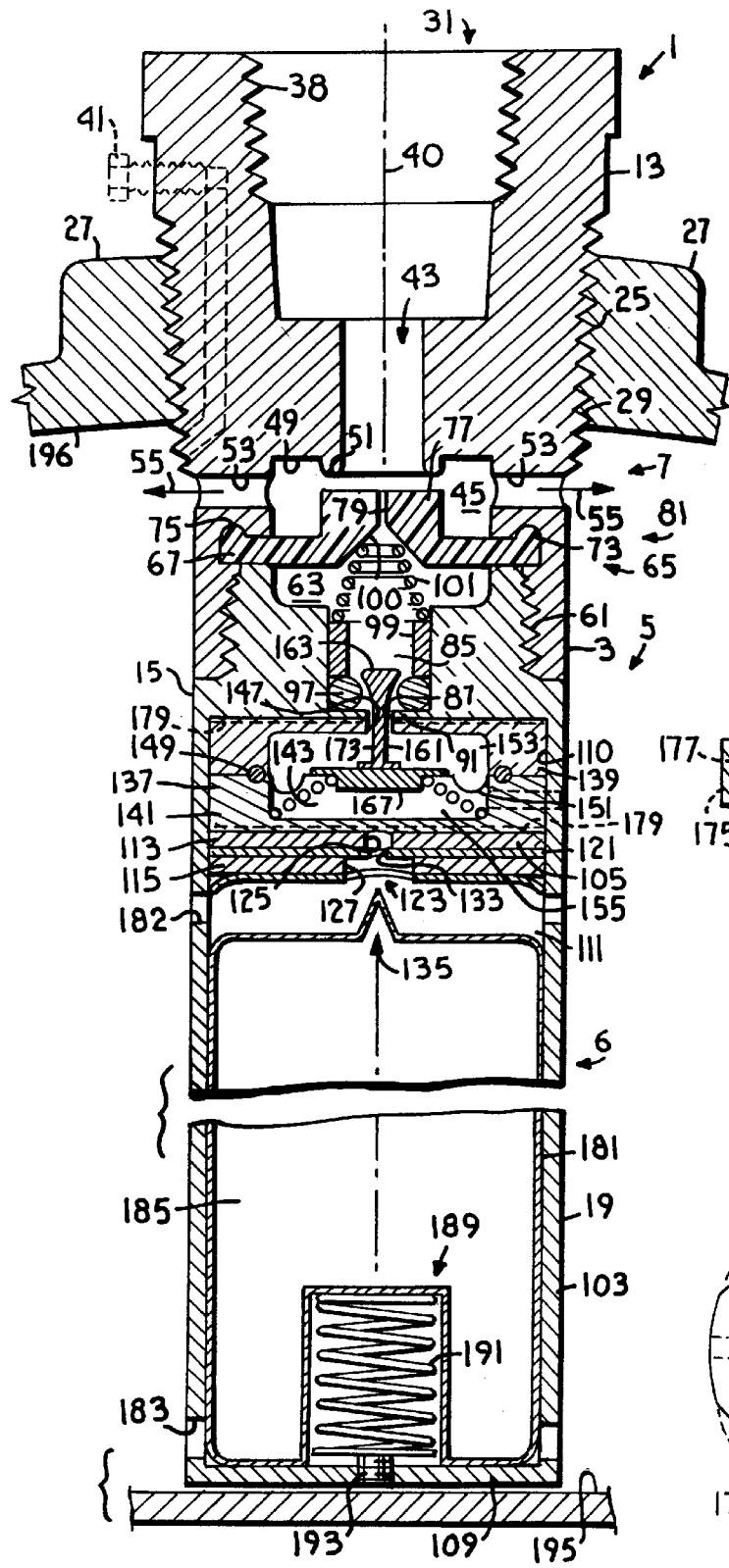

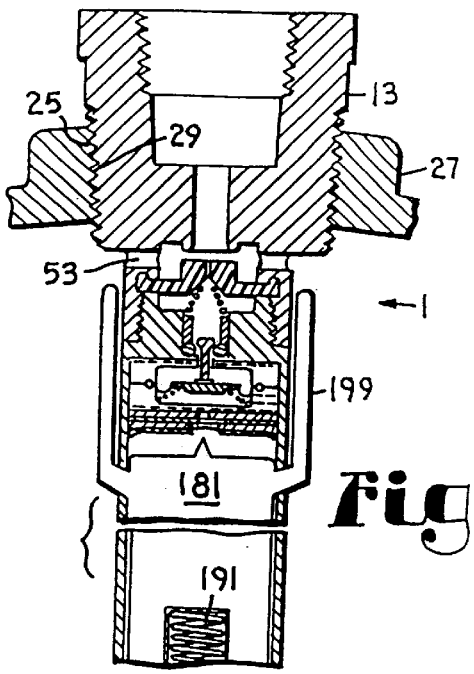
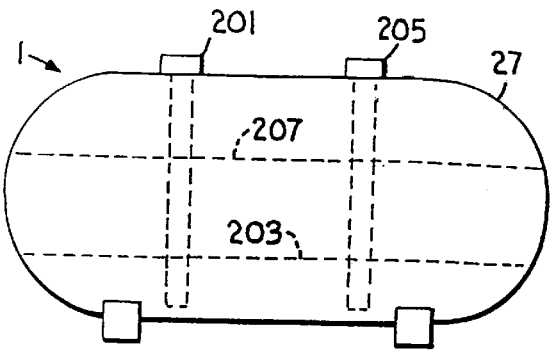
Fig.8.  Fig.9.
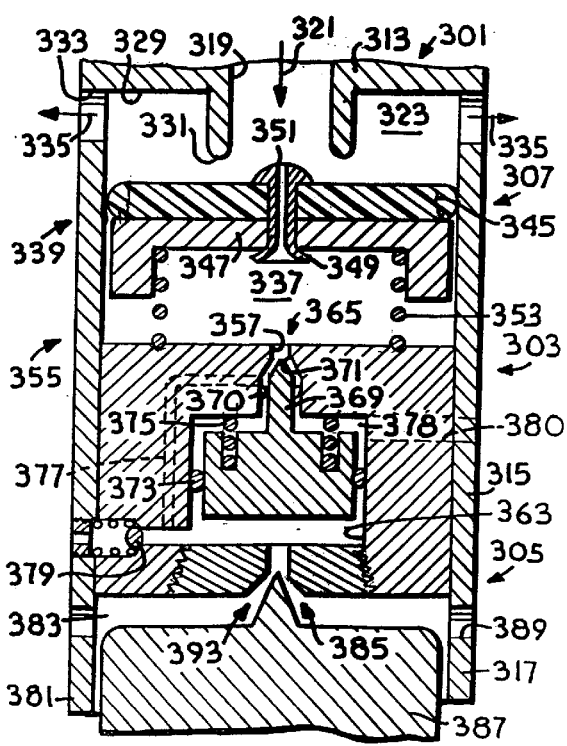
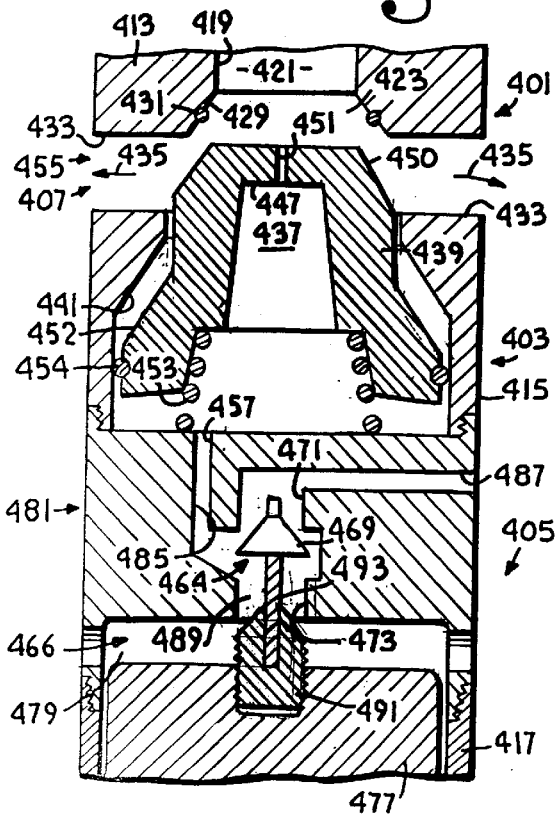
Fig.10.  Fig.11.

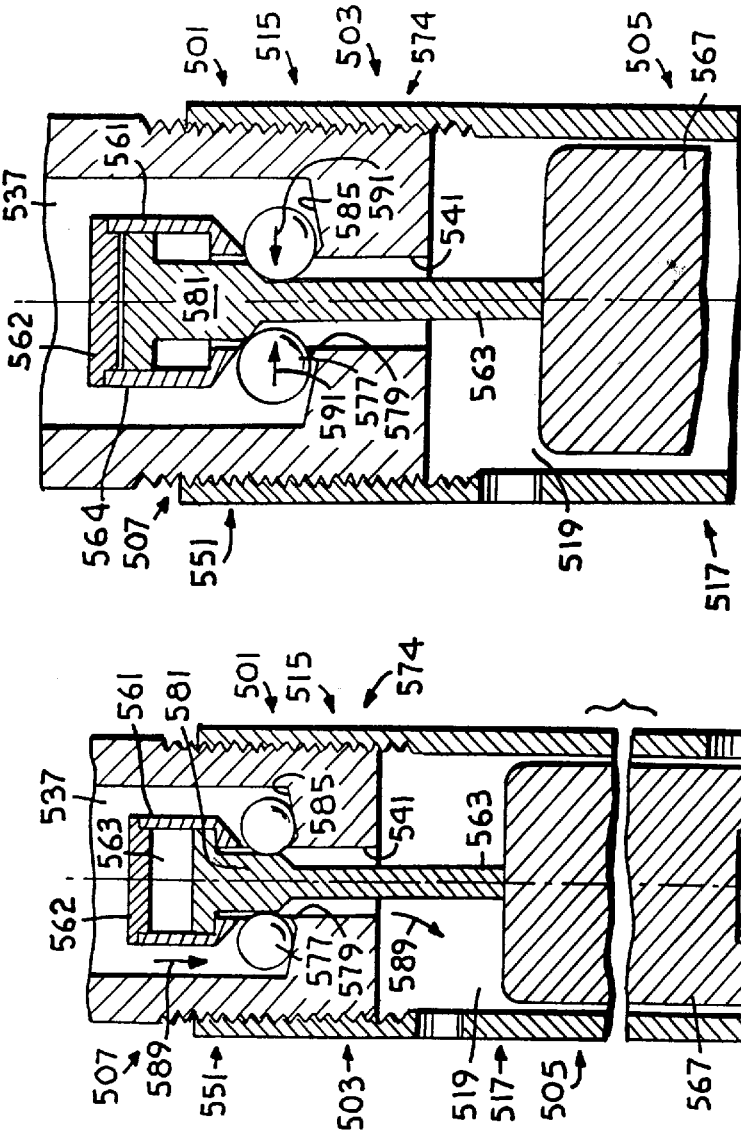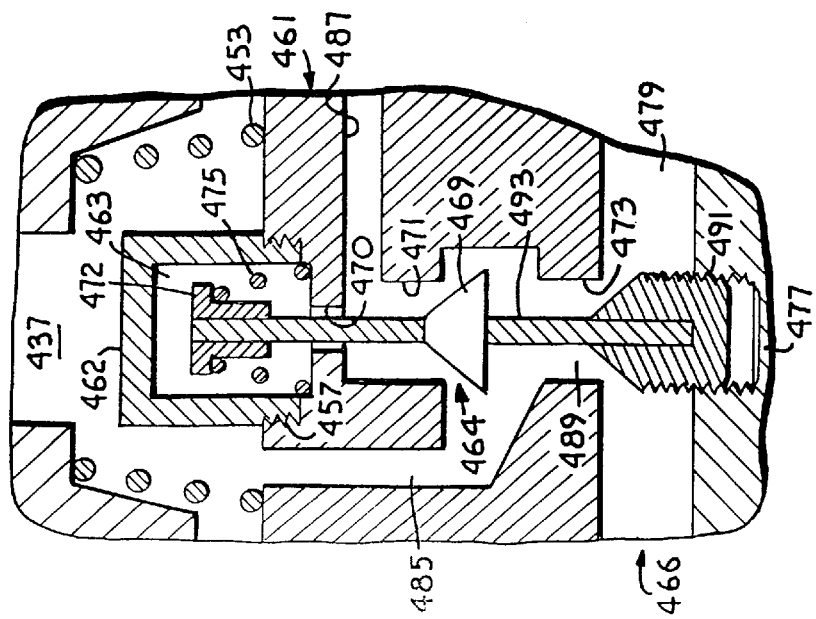

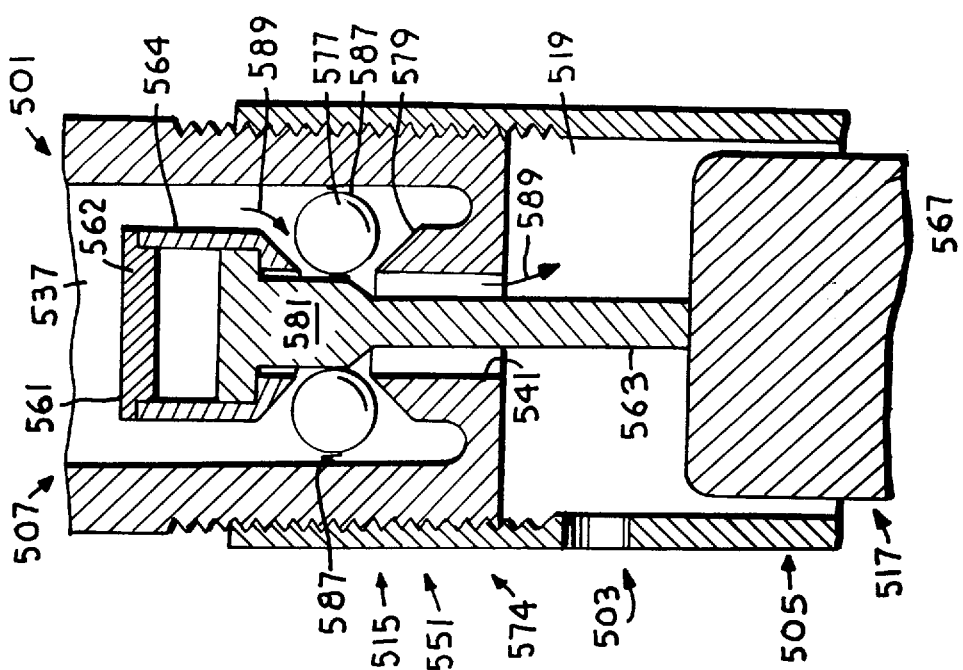
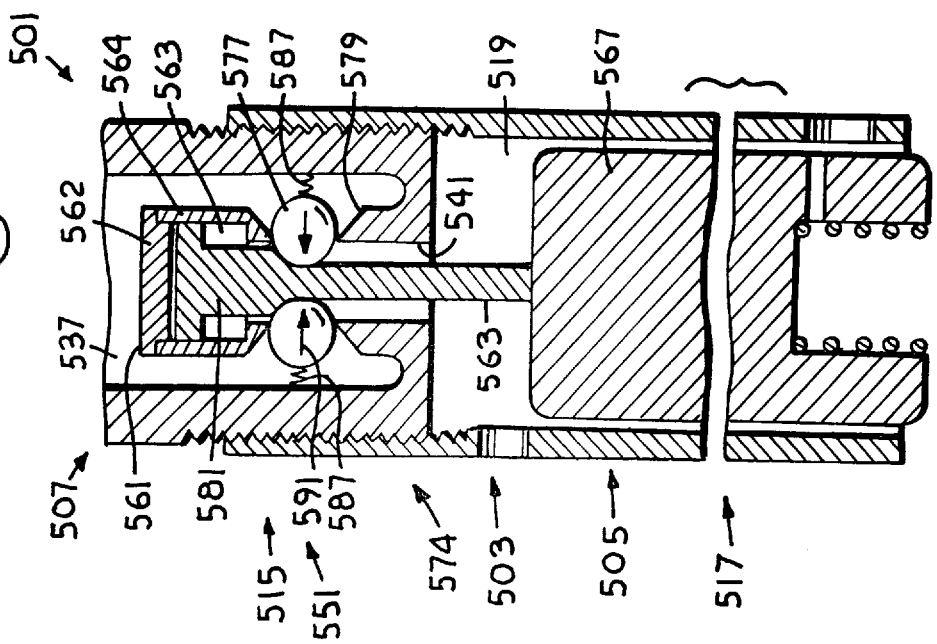

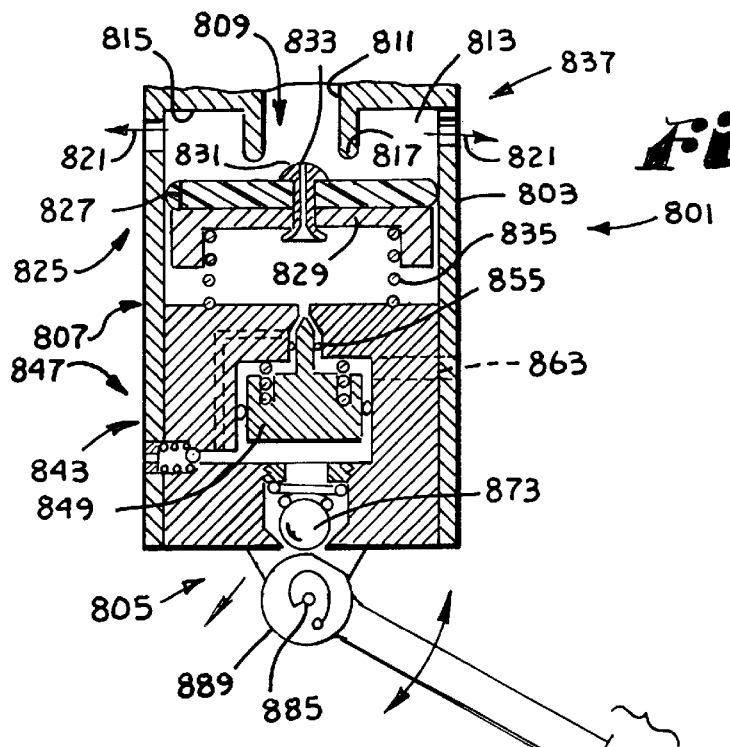
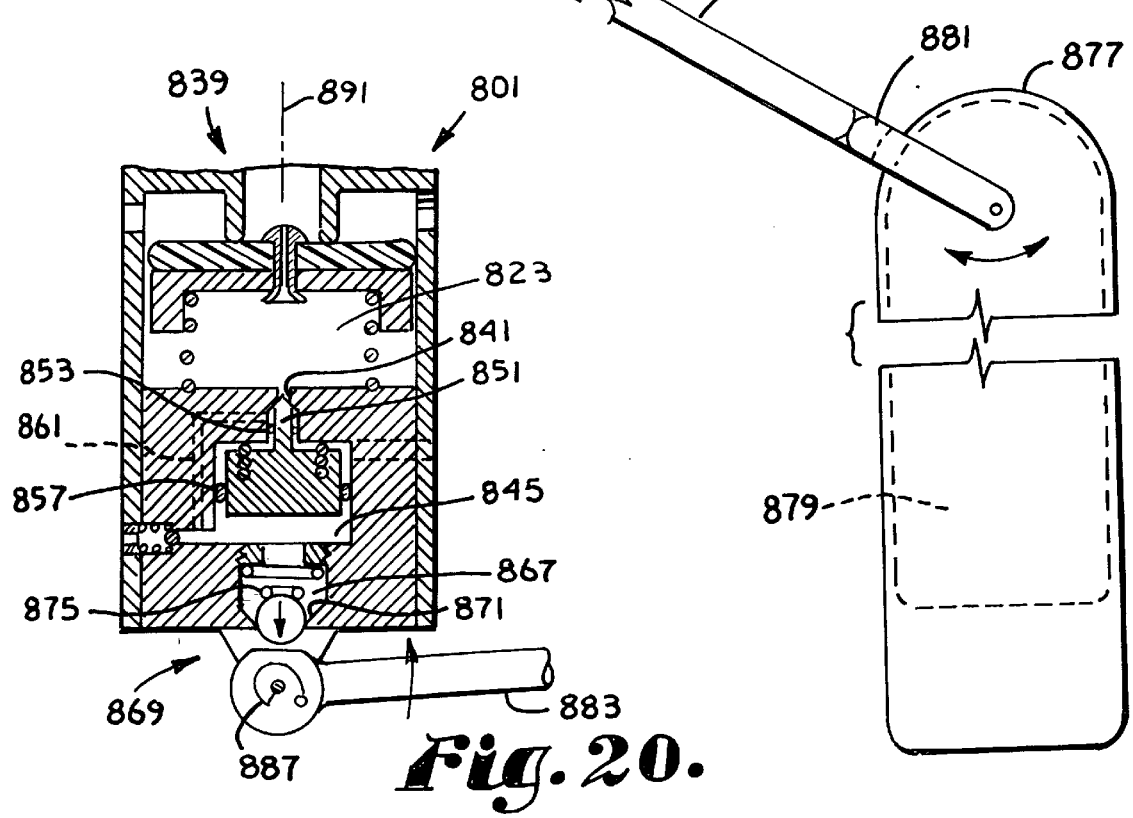

CONTAINER HAVING FLUID-WEIGHT CONTROL DEVICE

This application is a C-I-P of Ser. No. 08/755,292, filed Nov. 22, 1996.

BACKGROUND OF THE INVENTION

1. Field of the Invention

This invention relates generally to fill valves and containers for containing fluids and, more particularly but without limitation, to fill values and containers for containing fluids such as propane, butane, and the like.

2. Description of the Related Art

A common occurrence is the filling of containers with fuel or other fluids, such as portable propane tanks for barbeque equipment for example. A common procedure for filling such a tank, wherein the weight of the tank is generally visibly stamped on its outer surface, is to place the tank on scales set at a particular weight, such as twenty pounds plus the empty or tare weight of the tank. As the tank is being filled, someone watches the scales; when the balance indicates that the weight of the tank and its contents is equal to the setting on the scales, filling of the tank is terminated. Presumably, the tank then holds the desired twenty pounds of fluid. Unfortunately, that may not be the case. For instance, the weight stamped on the tank may not be equal to the weight that would be observed if the tank were totally empty. If the tank has mud or other debris adhering thereto such that the stamped weight is less than the empty weight of the tank at the time of filling, the patron will get less than his money's worth because he will be paying for propane that he is not receiving, namely the desired weight of propane less the weight of the debris. Further, the scales may not be properly calibrated or balanced, or the scales may be set at a reading of less than tare weight plus twenty pounds, particularly if the patron is not positioned whereby the filling attendant's activities can be closely observed. As a result, the patron may again be getting less than his money's worth.

Conversely, a careless or over-busy attendant may permit a patron to fill his own tank. In that situation, the patron may be tempted to get more than his money's worth and introduce more than twenty pounds of propane into the tank, which may present a serious safety problem. The volumes of many fluids, such as butane, propane, etc., are temperature dependent. For example, the volume of a given weight of propane increases approximately one percent for each temperature increase of approximately 5–6° F. Thus, as the temperature of propane increases, the weight or mass of propane that can be placed in a given volume at a given pressure decreases. By the same token, the pressure of a given weight of a temperature-dependent fluid placed in a closed container at a given temperature may substantially increase as the temperature of the fluid increases.

As a more specific example, the pressure of liquid/vapor phase propane at −44° F. is approximately zero psig and at 100° F. is approximately 172 psig, or a pressure change of 172 psig for a temperature change of 144° F. However, a temperature increase of 1° F. in liquid-phase only propane may cause a pressure increase in excess of 500 psig.

Therefore, what is needed is a device and a container having such a device that determines a certain "filled" condition of the container as fluid is being introduced thereinto by detecting the containment of a predetermined weight of fluid in the container; that automatically prevents further filling of the container beyond such a "filled" condition; that prevents further filling of the container beyond such a "filled" condition even though conduct to thwart such a device is attempted by inducing inertial effects therein; that is substantially independent of the composition, pressure, and/or temperature of the fluid being introduced into and/or contained by the container; that is immune to errors in scales or tare weight of the container; that prevents introduction of fluid into the container unless the container has a essentially upright orientation; and that controls flow into the container by a pressure that has a substantially smaller magnitude than the pressure at which fluid is being introduced into the container.

SUMMARY OF THE INVENTION

An improved device, and an improved container having such a device, is provided for automatically controlling the weight of fluid introduced into and/or contained by the container. The device and container include structure for mounting the device to the container; a main valve or channel for introducing the fluid into the container at any desired fill pressure; a detection mechanism configured to detect containment of a predetermined weight of fluid in the container; a detection mechanism configured to detect a "filled" condition of the container, wherein the "filled" condition of the container is based on the container containing a predetermined weight of the fluid; and a shut off or overfill prevention mechanism, responsive to the detection mechanism, configured to automatically prevent introduction of additional fluid into the container as "filled" condition of the container is detected by the detection mechanism.

The detection mechanism includes a displacer, that extends substantially the entire vertical spacing within the container as the container assumes an upright orientation since the mechanism is responsive to density of fluid in the vapor phase and well as to density of fluid in the liquid phase including of course fluid that is simultaneously present in both the vapor and liquid phases, and a resilient member such as a compression spring configured to operably offset a portion of the weight of the displacer such that the displacer is buoyant as the container assumes an upright orientation and the container contains the desired weight of the fluid needed to constitute the "filled" condition of the container. The displacer has a valving mechanism configured to operably activate the fluid-weight control mechanism as buoyancy of the displacer causes the valving mechanism to fluid-tight sealingly engage an orifice mechanism. The fluid-weight control mechanism includes a differential pressure control system configured to operably provide control of a substantially greater fill pressure with a much smaller differential pressure across the differential pressure control system such as by reducing the differential pressure to which the valving arrangement at the top of the displacer is exposed.

In addition, the fluid-weight control mechanism is configured to prevent introduction of fluid into the container as the container assumes a non-upright orientation even though the container may not have assumed the "filled" condition. Also, the result provided by the fluid-weight control mechanism is substantially independent of the composition, temperature, or pressure of the fluid contained in the container. Further, the fluid-weight control mechanism is also configured to be substantially independent of inertial effects generated in an attempt to introduce additional fluid into the container beyond that required to constitute the "filled" condition of the container.

Modified embodiments utilize a pilot valve arrangement and/or a pivotally mounted displacer and valving/orifice arrangements instead of the differential pressure feature.

The improvement includes a method for practicing the invention as described.

PRINCIPAL OBJECTS AND ADVANTAGES OF THE INVENTION

The principal objects and advantages of the present invention include: providing a device for preventing further filling of a container wherein the container contains a predetermined weight of fluid or fluids, and a container having such a device; providing such a device and a container wherein a certain "filled" condition of the container is based on the weight of fluid or fluids contained in the container; providing such a device and a container wherein such "filled" condition of the container is substantially temperature independent; providing such a device and a container wherein such "filled" condition of the container is independent of the density of the fluid or fluids contained in the container even though the level if any of the fluid or fluids in the container may vary; providing such a device and a container wherein filling of the container is substantially immune to inertial effects generated in an attempt to fill the container beyond the "filled" condition of the container; providing such a device and a container wherein introduction of fluid into the container is prevented as the container assumes a non-upright orientation; providing such a device and a container wherein introduction of fluid into the container is controlled by a differential pressure that is substantially smaller than the pressure at which fluid is being introduced into the container; providing such a device and a container wherein introduction of fluid into the container is controlled by a pressure that is substantially smaller than the pressure at which fluid is being introduced into the container; providing such a device and a container wherein introduction of fluid into the container is controlled by a pilot valve arrangement that is activated by a pressure that is substantially smaller than the pressure at which fluid is being introduced into the container; providing such a device and a container wherein a pilot valve has at least one ball-type valve wherein the ball thereof may be operating either at approximately full filling pressure or at a pressure substantially reduced from the full filling pressure, depending on the particular configuration; providing such a device and container wherein introduction of fluid into the container is controlled by a two-stage pilot valving arrangement, one stage providing controlled feeding of fluid into and bleeding of fluid from a first cavity and a second stage controlled by a displacer; and generally providing such a device and a container which is economical to manufacture, effective in operation, reliable in performance, capable of long operating life and particularly well adapted for the proposed usage thereof.

Other objects and advantages of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 1 is a perspective view of a container having a fluid-weight control device, according to the present invention.

FIG. 2 is an enlarged longitudinal and fragmentary, partially cross-sectional view of the fluid-weight control device, showing the device in an open configuration.

FIG. 4 is an enlarged plan view of a top portion of a differential pressure control device of the fluid-weight control device.

FIG. 5 is an enlarged and cross-sectional, side elevational view of the top portion of the differential pressure control device of the fluid-weight control device, taken along line 5—5 of FIG. 4.

FIG. 8 is a fragmentary, partially cross-sectional view of the fluid-weight control device, similar to but reduced relative to FIG. 2, showing a displacer with extenders.

FIG. 9 is a schematic representation of a container having two of the fluid-weight control devices, according to the present invention.

FIG. 10 is an enlarged longitudinal and fragmentary, cross-sectional view of a first modified embodiment of the fluid-weight control device, according to the present invention.

FIG. 11 is an enlarged longitudinal and fragmentary, cross-sectional view of a second modified embodiment of the fluid-weight control device.

FIG. 12 is a further enlarged longitudinal and fragmentary, cross-sectional view of the second modified embodiment of the fluid-weight control device, similar to FIG. 11 but showing an alternative arrangement for adjusting the displacer.

FIG. 13 is a fragmentary, cross-sectional view of a third modified embodiment of the fluid-weight control device, similar in scale to that shown in FIG. 8, showing the device in an open configuration, according to the present invention.

FIG. 14 is a fragmentary, cross-sectional view of the third modified embodiment of the fluid-weight control device, similar to but enlarged from that shown in FIG. 13 and showing the device in a closed configuration.

FIG. 15 is a fragmentary, cross-sectional view of the third modified embodiment of the fluid-weight control device, similar to that shown in FIG. 13 but showing the device in a closed configuration, according to the present invention.

FIG. 16 is a fragmentary, cross-sectional view of the third modified embodiment of the fluid-weight control device, similar to but enlarged from that shown in FIG. 15 and showing the device in an open configuration.

FIG. 19 is a fragmentary, cross-sectional view of a fifth modified embodiment of the fluid-weight control device, similar in scale to that shown in FIG. 15, showing the device with a pivotally mounted displacer and in an opened configuration, according to the present invention.

FIG. 20 is a fragmentary, cross-sectional view of the fifth modified embodiment of the fluid-weight control device, similar to that shown in FIG. 19 but showing the device in a closed configuration.

DETAILED DESCRIPTION OF THE INVENTION

Figure 3:
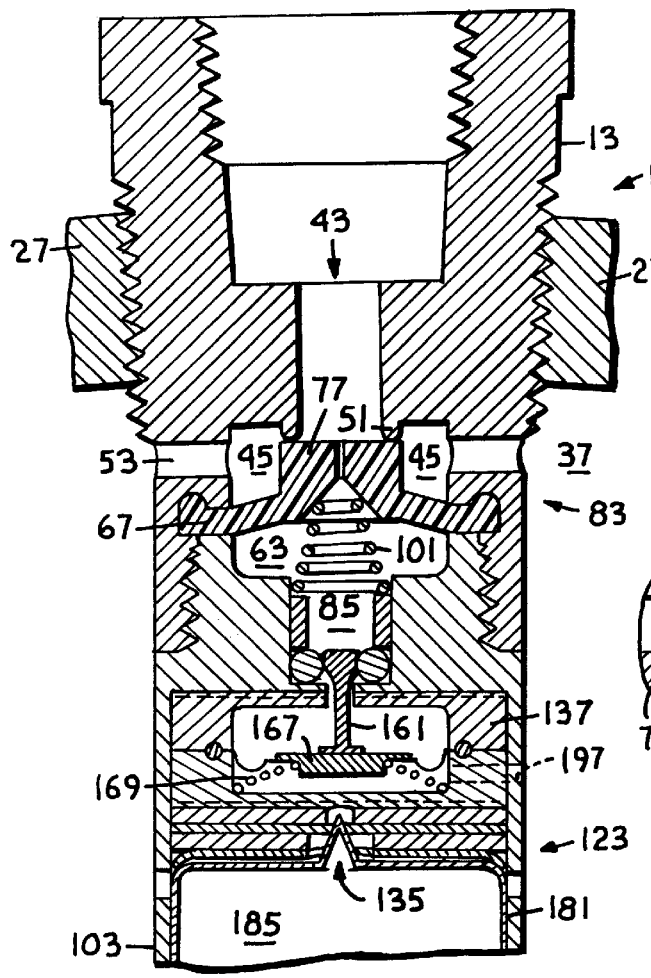
FIG. 3 is an enlarged longitudinal and fragmentary, cross-sectional view of the fluid-weight control device, similar to that shown in FIG. 2 but showing the device in a closed configuration.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to either a fluid-weight control device or a container having such a fluid-weight control device, in accordance with the present invention, as shown in FIGS. 1 through 9. The device 1 comprises body means 3 and fluid-weight control means 5 including predetermined fluid-weight detection means 6, and shut off means 7.

The body means 3 generally includes an input portion 13, an intermediate portion 15, and a tail portion 19, as hereinafter described. The input portion 13 generally includes container connection means, such as a threaded outer surface 25, for attachment to a tank, cylinder, vessel or other suitable container 27 having a mated tapped throughbore 29. It is to be understood that the present invention is not limited to containers for propane or butane but is applicable to a multitude of different container structures for a multitude of different fluids and mixtures thereof, i.e. liquids and gases, such as iso-butane, propane/butane, salt water, etc., for example.

The input portion 13 generally has an axially extending input channel 31 for receiving fluid therethrough for introduction into a container cavity 37 of the container 27. The input portion 13 has connecting means 38, such as an internally or externally threaded surface, for connection to an external fitting such as a hose and adapter for transferring fluid from a source (not shown) to the container 27. For example, the input portion 13 may comprise a manual shut off valve 39 such as that found on some twenty-pound net capacity propane containers commonly used with barbeque equipment wherein the input channel 31 is angled to one side, generally perpendicularly to an axis 40, as shown in FIG. 1. In addition, the input portion 13 may include a pressure release valve 41, such as that schematically shown in FIG. 2, with a passageway to the upper vapor space of the container cavity 37 of the container 27, and/or a liquid lever detector 42 configured to check the liquid level of the fluid contained in the container 27, as commonly known in the art.

It is to be understood that the pressure relief valve 41 may be an integral part of the device 1 as shown in FIG. 2 or, alternatively, may be a part of the container 27 and separated from the device 1. It is also to be understood that the liquid level detector 42 may be a part of the container 27 and separated from the device 1 as shown in FIG. 1 or, alternatively, may be an integral part of the device 1.

The input portion 13 also includes a throat 43 leading into a distribution cavity 45, which is generally cylindrically shaped and arranged coaxially about the axis 40. An upper wall 49 of the distribution cavity 45 is configured such that a circularly shaped lip 51 extends downwardly therefrom. At least one branch channel 53, and perhaps a plurality thereof depending on the application, is configured to distribute fluid from the input channel 31 to the container cavity 37, as indicated by the arrows designated by the numeral 55 in FIG. 2.

The intermediate portion 15 is spaced adjacently to, and generally aligned coaxially with, the input portion 13. The intermediate portion 15 is fixedly connected to the input portion 13, such as by mated threads 61. The shut off means 7 includes the intermediate portion 15 having a generally cylindrically shaped shut off cavity 63 aligned with the distribution cavity 45.

The shut off means 7 also includes a partition arrangement 65 configured to substantially separate the distribution cavity 45 from the shut off cavity 63. The partition arrangement 65 includes a partition wall or diaphragm 67 spaced generally between the input portion 13 and the intermediate portion 15. The partition wall 67 has a generally circular shape, with an enlarged peripheral edge 73 captured in a circularly shaped groove 75. The partition wall 67 also has a thickened hub 77 extending toward the lip 51, as shown in FIG. 2.

The partition wall 67 has a port 79 axially therethrough. The diametric dimension of the port 79 is substantially smaller than each of the transverse dimension of the throat 43 and the cross-sectional areas available for fluid flow through the branch channels 53. As a result, the volume of fluid flowing through the port 79 is minimal in comparison to the volume of fluid flowing through the branch channels 53.

The partition wall 67 is generally constructed of resilient, flexible material, such as fabricized rubber or other suitable material for example, such that the hub 77 thereof can be flexed upwardly to abuttingly engage the lip 51 to thereby prevent fluid from being distributed from the input channel 31 to the distribution cavity 45 and the branch channels 53. The partition wall 67 is configured such that as the pressure of fluid within the shut off cavity 63 is substantially less than the pressure of fluid within the distribution cavity 45, the hub 77 will be spaced apart from the lip 51, sometimes referred to herein as an opened configuration 81. The partition wall 67 is further configured whereby the hub 77 is not spaced apart from the lip 51 as the pressure of fluid within the shut off cavity 63 approaches the pressure of fluid within the distribution cavity 45 but, instead, is flexed upwardly to establish the aforesaid abutting engagement with the lip 51, sometimes referred to herein as a closed configuration 83, as shown in FIG. 3.

The adjacent transverse dimensions of the shut off cavity 63 and the distribution cavity 45 are substantially similar but are substantially greater than the transverse dimension of the throat 43. Therefore, as the hub 77 bears against the lip 51, the upwardly directed fluid force in the shut off cavity 63 maintaining the abutting engagement therebetween is substantially greater than the downwardly directed force of the fluid in the throat 48, unless the fluid in the shut off cavity 63 is vented through a control bleed port 91, which occurs while the shut off means 7 permits introduction of fluid into the container 27 as described herein.

Figure 6:
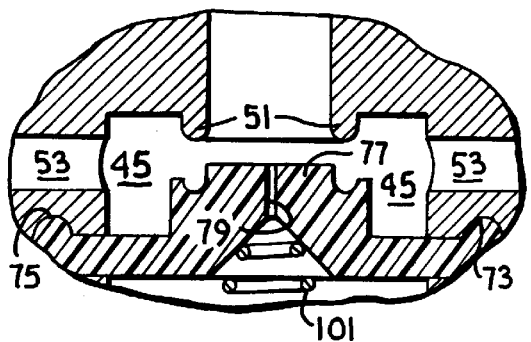
FIG. 6 is a further enlarged and fragmentary, cross-sectional view of a diaphragm of the fluid-weight control device, showing the diaphragm having an alternative configuration different from that shown in FIG. 2.
Figure 7:
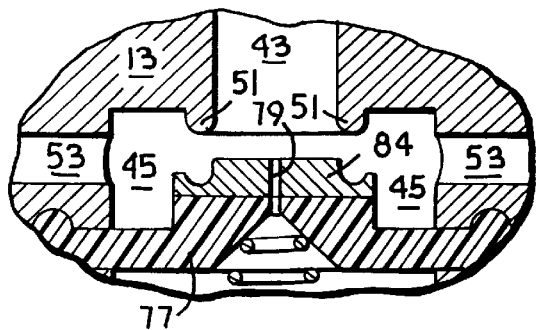
FIG. 7 is a further enlarged and fragmentary, cross-sectional view of another configuration of the diaphragm of the fluid-weight control device.

If desired, the hub 77 may be profiled to more intimately mate with the lip 51, as shown in FIG. 6. Alternatively, the hub 77 may include a plate 84 that is precisely machined to mate with the lip 51, as shown in FIG. 7. It is to be understood that the hub 77 may have numerous different configurations within the nature and scope of the present invention and is not limited to the configurations discussed herein.

The shut off means 7 also includes the intermediate portion 15 having a seat cavity 85 extending axially from the shut off cavity 63 toward, but terminating short of, the tail portion 19 such that a seat wall 87 is formed between the seat cavity 85 and the tail portion 19. A control bleed port 91 extends axially through the seat wall 87.

A seat member 97 having a torus shape or other suitable configuration, such as a precision machined brass ring or an O-ring constructed of rubber or other suitable arrangement, is spaced within the seat cavity 85 in abutting engagement with the seat wall 87. A sleeve 99 or other suitable arrangement, installed by press- or shrink-fit within the seat cavity 85, maintains the seat member 97 securely in place. Preferably, the partition wall 67 has a conically shaped depression 100 opposite the hub 77, as shown in FIG. 2. A compression spring 101 may be used to assist with forcing the hub 77 against the lip 51 as the device 1 assumes the closed configuration 83. The spring constant of the spring 101, however, must be such that the spacing relation between the hub 77 and the lip 51 can operably assume the opened configuration 81 as the fluid pressure in the shut off cavity 63 is substantially less than the fluid pressure in the distribution cavity 45.

The tail portion 19 has a cylindrically shaped outer wall 103 extending from the intermediate portion 15 to a distal member 109. An inner wall 105 divides the space within the outer wall 103 into a control cavity 110 and a tail cavity 111. The inner wall 105 may be constructed of a pair of rigid side walls 113, 115 with an intermediate wall 121 sandwiched therebetween, or other suitable arrangement. An orifice arrangement 123 provides fluid flow communication between the control cavity 110 and the tail cavity 111. The orifice arrangement 123 generally includes an inner orifice 125 through the side wall 113, a larger outer orifice 127 through the side wall 115, and a middle orifice 133 through the intermediate wall 121. The intermediate wall 121 is generally constructed of resilient material and the middle orifice 133 is sized such that a fluid-tight sealing engagement is established by a valving arrangement 135, including the inner wall 105, as the container and device 1 assume a "filled" condition, as hereinafter described. It is to be understood that "filled" may mean the container 27 is filled to the maximum capacity recommended by the manufacturer thereof, sometimes referred to herein as the "full" condition, or, instead, may mean the container 27 contains a predetermined weight of fluid or fluids wherein such predetermined weight represents a quantity of the fluid or fluids that is less than the quantity corresponding to the "full" condition.

Alternatively, the inner wall 105 may consist of a single-layer structure, such as one of the side walls 113, 115 and without the intermediate wall 121. In that event, the orifice arrangement 123 would comprise the corresponding remaining one of the orifices 125 or 127 being precision-machined in order to form the aforesaid fluid-tight sealing engagement provided by the valving arrangement 135 as the container and device 1 assume the "filled" condition.

A regulator or differential pressure control device 137, which substantially occupies the control cavity 110, has an upper portion 139 that is substantially similar to a lower portion 141 thereof, such that a control chamber 143 is formed therebetween. The upper portion 139 has a device bleed port 147 sized similarly to and aligned with, the control bleed port 91. An O-ring 149 in an O-ring groove 150, or other suitable arrangement, provides a fluid-tight seal between the upper portion 139 and the lower portion 141. A diaphragm arrangement 151 between the upper portion 139 and the lower portion 141 divides the control chamber 143 into an upper chamber 153 and a lower chamber 155.

A stem portion 161, having a generally inverted conically shaped upper end 163, is secured to a disk portion 167 of the diaphragm arrangement 151 and is spaced such that the upper end 163 extends beyond the seat member 97. A helical spring 169 provides support for the disk portion 167, as hereinafter described. The inverted conical shape of the upper end 163 is sized such that the upper end forms a fluid-tight sealing engagement with the seat member 97 as the upper end 163 is displaced downwardly toward, and into abutting engagement with, the seat member 97. The upper end 163 is connected to the disk portion 167 by a shaft 173 that is sized smaller than the control bleed port 91 and the device bleed port 147 such that fluid can flow from the seat cavity 85, through the cavity bleed port 91 and the control bleed port 147 and into the upper chamber 153 as the upper end 163 is spaced apart from the seat member 97.

The area of the diaphragm 67 exposed to the shut off cavity 63 is substantially greater than the cross-sectional area of the throat 48 opposing the shut off cavity 63. Thus, as the hub 77 bears against the lip 51, the upwardly directed fluid force in the shut off cavity 63 maintaining the abutting engagement therebetween is substantially greater than the downwardly directed force of the fluid in the throat 48, unless the fluid in the shut off cavity 93 is vented through the control bleed port 91, which occurs while the shut off means 7 permits introduction of fluid into the container 27 as described herein.

The upper portion 139 and the lower portion 141 are generally cylindrically shaped but have one or more truncated sectors 175 such that passageways 177 are formed between the differential pressure control device 137 and the outer wall 103. One or more grooves 179 in the upper portion 139 along the juncture between the differential pressure control device 137 and the intermediate portion 15 and one or more similar grooves 179 in the lower portion 141, in combination with the passageways 177, provide flow communication between the control bleed port 91 and the orifice arrangement 123.

The predetermined fluid-weight detection means 6 of the fluid-weight control means 5 includes a float or displacer 181. Ports 182 and 183 situated near each end of the displacer 181 provide fluid flow communication between the container cavity 37 and the tail cavity 111. The displacer 181 has an outside diameter that is dimensioned slightly smaller than the inside diameter of the outer wall 103 such that the displacer 181 can be slidably displaced along the axis 40 within the outer wall 103. The outer wall 103 and the displacer 181 are constructed such that any frictional forces therebetween are minimal.

The displacer 181 is generally constructed of light weight material, such as aluminum, or other suitable material. The displacer 181 has a sealed displacer cavity 185 that is dimensioned such that the displacer 181 becomes buoyant as the container 27 contains a weight of fluid that is slightly smaller in magnitude than the weight of fluid predetermined to constitute a "filled" condition for the container 27. Such an arrangement assures that frictional forces generated between the displacer 181 and the outer wall 103 by gravitational components arising from the weight of the displacer 181 are minimal, particularly since the spacing between the displacer 181 and the outer wall 103, although minimal, is sufficient to allow fluid therebetween to serve as a lubricant for longitudinal displacement of the displacer 181 within the outer wall 103.

The displacer 181 has an axially situated spring cavity 189 formed in an outer surface thereof such that a compression spring 191 is mountable therein between the displacer 181 and the distal member 109. The spring 191 is configured whereby the axial force exerted by the spring 191 on the displacer 181 causes the displacer 181 to become buoyant as the weight of fluid in the container 27 satisfies a "filled" condition as the container 27 assumes a normal operating orientation, sometimes referred to herein as an upright orientation. As a result, the displacer 181 abuts against the distal member 109 as the weight of the fluid in the container 27 is less than that required to place the container 27 in a "filled" condition as the container 27 assumes an essentially upright position. If, however, the container 27 should be tilted from such an essentially upright position whereby the thrust provided by the spring 191 exceeds the gravitational weight component of the container 27 along the axis 40, then the spring 191 will responsively displace the displacer 181, causing the valving and orifice arrangements 123, 135 to establish a fluid-tight sealing engagement as described herein, thereby activating the shut off means 7 and preventing fluid from being introduced into the container cavity 37 as the container 27 is inclined from an essentially upright orientation, such as being tilted, lying horizontally, etc.

It is to be understood that the container 27 may have an oblong configuration with the long dimension thereof oriented horizontally, such as the container 27 shown schematically in FIG. 9; regardless, such orientation will be referred to herein as an upright orientation that represents the normal operating orientation of the container 27. It should also be obvious that the configuration of the resilient member 191 and the displacer 181 is dependent upon the particular composition of fluid to be introduced into the container 27.

Preferably, the displacer 181 has an axial length that is slightly less than the axial length of the tail cavity 111 such that the axial distance that the displacer 181 is displaced from resting against the distal member 109 to establishing the fluid-tight sealing engagement is minimal. If desired, an adjusting mechanism 193 may be provided to increase or decrease the thrust of the spring 191 to allow for minor manufacturing deviations in the spring constant of the spring 191.

Preferably, the displacer 181 extends from near a bottom wall 195 of the container 27 to near a top wall 196 of the container 27. In addition, the displacer 181 preferably has a differential buoyancy characteristic that corresponds to variations in the horizontal cross-sectional areas of the container cavity 37. An important feature of the present invention is that the device responds to density of fluid in the vapor phase as well as to density of fluid in the liquid phase, including, of course, fluid existing simultaneously in both the liquid and vapor phases. In other words, the buoyancy contributed by a horizontal slice of the displacer 181 is directly proportional to the corresponding horizontal cross-sectional area of the container cavity 37. The differential buoyancy contributed to the total buoyancy of the displacer 181 at a given level in the container 27, whereat the horizontal cross-sectional area of the container cavity 37 is a certain magnitude, is greater or lesser than the differential buoyancy contributed at another level whereat the horizontal cross-sectional area of the container cavity 37 is correspondingly greater or lesser, the difference in differential buoyancy being in direct proportion to the difference in horizontal cross-sectional area of the container cavity 37 at those two levels. As a result, errors arising from the shape of the container 27 and from the level of fluid in the container 27 at the "filled" condition are substantially reduced or entirely eliminated.

In other words, if the container 27 is cylindrically shaped with a uniform horizontal cross section and horizontal top and bottom walls, the displacer 181 of the present invention may also be cylindrically shaped with a uniform horizontal cross section. However, if the container 27 does not have a uniform horizontal cross section, then the horizontal cross section of the displacer 181 must vary accordingly to obtain desired "filled" accuracy, particularly with regard to fluids present in the container 27 in both the liquid and vapor phases.

To place the displacer 181 in closer proximity to the top wall 196 to thereby further reduce possible error, the displacer 181 may include extenders 199 extending alongside the intermediate portion 15, as schematically shown in FIG. 8. Preferably, the lateral dimensions of the extenders 199 are structured such that the device I can be inserted and withdraw through the tapped throughbore 29. Of course, the extenders 199 are preferably structured such that differential buoyancy characteristics thereof are consistent with those of the remainder of the displacer 181.

It is to be understood that the configuration of the device of the present invention for a particular application is dependent upon the volume and shape of the container 27. More specifically, one of the devices designed for a first container 27 having a given volume and shape but installed on a second container 27, having a different volume and/or shape, will not necessarily shut off filling of the second container 27 at the same fluid weight at which it would shut off filling of the first container 27.

In an application of the present invention wherein a fluid or fluids are to be introduced into the container 27, the container 27 is placed in an upright orientation as shown in FIG. 1. A nozzle (not shown) from a source of fluid is attached to the input portion 13. The fluid is generally supplied to the input portion 13 at an elevated pressure—200–350 psi, for example—which is substantially greater than vapor pressures existing within the container cavity 37. Assuming the container 27 has not assumed a "filled" condition, the fluid from the source flows through the input channel 31, into the distribution cavity 45, and out through the branch channels 53 into the container cavity 37.

As the fluid flows from the (unshown) source to the container cavity 37, some of the fluid flows through the port 79 into the shut off cavity 63 and the seat cavity 85. If there were no outlet other than the port 79 for the fluid to escape from the shut off cavity 63 and the seat cavity 85, the pressure of the fluid within the shut off cavity 63 and the seat cavity 85 would quickly approach the pressure of the fluid in the distribution cavity 45 and the shut off means 7 would then prevent introduction of fluid into the container cavity 37.

There is, however, another outlet for the fluid to escape from the shut off cavity 63 and the seat cavity 85, namely alongside the stem portion 161 through the control bleed port 91 and the device bleed port 147, into the upper chamber 153 of the differential pressure control device 137 and through the grooves 179 in the upper and lower portions 139, 141, the passageways 177, and the valving arrangement 135. Fluid flowing through the valving arrangement 135 readily flows alongside the displacer 181, between the displacer 181 and the outer wall 103, and through the ports 182 and 183. The flow capacity of the control bleed port 91, the device bleed port 147, the grooves 179, the passageways 177, and the valving arrangement 135 is substantially greater than the flow capacity of the port 79 such that the pressure of the fluid within the shut off cavity 63 is generally substantially less than the pressure of the fluid within the distribution cavity 45.

For an application wherein the desired weight of fluid contained in the container 27 to provide a "filled" condition is twenty pounds, the displacer 181 has a weight/volume characteristic whereby the weight plus the spring force is equal to the buoyancy when the container 27 contains slightly less than twenty pounds of the fluid as the container assumes an essentially upright orientation. In other words, the minimal additional weight of fluid required to place twenty pounds of fluid in the container 27 is just sufficient to overcome minimal frictional forces between the displacer 181 and the outer wall 103 and cause the displacer 181 to be to buoyed the short distance upwardly such that the valving arrangement 135 prevents further flow of the fluid through the orifice arrangement 123 and causes the shut off means 7 to prevent further introduction of fluid into the container 27.

The level of fluid in the container cavity 37 at "filled" condition is dependent upon the density of the fluid being introduced into the container 27. In other words, the level of water—which has a specific gravity that is greater than the specific gravity of propane—needed to establish the fluid-tight sealing engagement of the valving arrangement 135 is lower than the level of propane needed to establish that sealing engagement. By minimizing the separation of the displacer 181 from both the bottom wall 195 and the top wall 196 of the container 27, and by minimizing the distance the displacer 181 must be displaced in order to establish the fluid-tight sealing engagement, the variance between the weights of different fluids needed to attain the "filled" condition is minimized, even though the specific gravities of the different fluids may be substantially different. In other words, at "filled" condition, the device 1 automatically prevents further introduction of fluid into the container 27 when the container 27 contains twenty pounds of the fluid, with only minimal error, regardless of whether the container 27 is filled with water or propane, etc.

Similarly, a given weight of fluid that has a temperature-dependent density will provide one level of fluid within the container 27 at one given temperature and will provide a different level of fluid within the container 27 at a different temperature. The weight of the fluid in the container 27, however, will be the same regardless of the difference in temperatures as the difference in densities will provide "filled" buoyancy for the displacer 181 at the appropriate fluid level to provide the desired weight of fluid in the container cavity 37. Although the displacer 181 may have a thermal coefficient of expansion which could change the buoyancy characteristics of the displacer 181 at two different temperatures, such change would generally be negligible in comparison to the temperature-dependent change in density of the fluid being introduced into the container 27. Further, for those fluids that are compressible, the "filled" condition provided by the device is independent of pressure.

In the event that a user tries to deceive the device 1 by placing the container 27 in a non-upright orientation and thereby attempt to overfill the container 27, such as by tilting the container 27 or by lying the container 27 horizontally on its side for example, the spring 191 would displace the displacer 181 along the tail cavity 111 such that the valving arrangement 135 immediately establishes a fluid-tight sealing arrangement. As a result, the device 1 would prevent fluid from being introduced into the container cavity 37. Similarly, if the user attempts to overfill the container 27 by attempting to deceive the buoyancy characteristics of the displacer 181, such as by subjecting the container 27 to repeated upwardly directed thrusts or by arcuately swinging the container 27 downwardly in at attempt to utilize centrifugal force in combination with gravitational force, such maneuvering would simultaneously affect the compressibility/density of the fluid, thereby substantially rendering such tactics essentially ineffectual.

In other words, the device of the present invention is designed whereby acceleration force components on the fluid from such arcuate swinging of the container 27 are additive to gravitational force components on the fluid in the container 27 which, in turn, contribute to the buoyant forces acting axially along the displacer 181 and thereby offset the acceleration force components generated in the displacer 181 itself from such arcuate swinging of the container 27. As a result, introduction of additional fluid into the container 27 beyond the "filled" condition is prevented, as herein described, even though the container 27 is subjected to arcuate swinging, etc. For example, if an application of the present invention involves filling the container 27 with water, a downwardly arcuate displacement thereof does not change the density of the water which is substantially incompressible; such an arcuate displacement adds to the gravitational component affecting the fluid and therefore contributes to the buoyancy of the displacer 181. Further, if the container 27 is dropped, the inertial forces created at impact also similarly add to the gravitational component and contribute to the buoyancy of the displacer 181.

As the fluid-tight sealing engagement of the valving arrangement 135 prevents fluid flow through the orifice arrangement 123, the flow of fluid through the grooves 179 and the passageways 177 is also prevented. Then, the only remaining outlet for fluid to escape from the shut off cavity 63 and the seat cavity 85 is into the upper chamber 153 of the differential pressure control device 137, which is obviously of limited capacity. As the quantity of fluid escaping from the seat cavity 85 into the upper chamber 153 through the control bleed port 91 and the device bleed port 147 is very limited, the fluid pressure in the seat cavity 85 rapidly approaches the fluid pressure in the distribution cavity 45.

As the pressure of fluid in the seat cavity 85 increases, additional fluid enters the upper chamber 153, forcing the disk portion 167 of the differential pressure control device 137 downwardly against the spring 169, thereby reducing the volume of the lower chamber 155. As the lower chamber 155 is connected in flow communication with the container cavity 37 via the port 197 through the lower portion 141 and the outer wall 103, fluid is forced from the lower chamber 155. As the pressure continues to increase in the seat chamber 85, the disk portion 167 is forced farther downwardly until the conically shaped upper end 163 forms a fluid-tight sealing engagement with the seat member 97, whereupon additional fluid is prevented from entering the upper chamber 153.

As all flow of the fluid through the control bleed port 91 and the device bleed port 147 is prevented, the fluid pressure in the seat cavity 85 and shut off cavity 63 rapidly approaches the fluid pressure in the distribution cavity 45, whereupon the hub 77 is forced against the lip 51, preventing fluid flow through the input channel 31 and the branch channels 53.

Generally, the spring 169 is configured to resist a downward pressure against the disk portion 167 of a predetermined magnitude in the range of approximately one-tenth to ten pounds per square inch, preferably approximately one pound per square inch. Thus, the flow of the fluid being introduced into the container 27 at a pressure of 200–350 psi is effectively controlled by a predetermined magnitude of differential pressure across the differential pressure control device 137 in the range of approximately only one-tenth to ten pounds per square inch.

It is foreseen that the container 27 may be configured with two of the devices 1 for some applications wherein two fluids or two mixtures of fluids are to be combined by weight, as schematically shown in FIG. 9. In that event, a first fluid or mixture of fluids would be introduced into the container 27 through a first one of the devices 1, designated by the numeral 201 in FIG. 9. The device 201 would be configured to permit the container 27 to receive or contain up to a predetermined weight of the first fluids, represented by the dotted line designated by the numeral 203. Then, a second fluid or mixture of fluids would be introduced through the other one of the devices 1, designated by the numeral 205 in FIG. 9. The device 205 would be configured to permit the container 27 to contain up to a predetermined total weight for both of the first and second fluids, represented by the dotted line designated by the numeral 207. The same concept can be extended to mixtures by weight of more than two fluids or more than two mixtures or fluids by using a corresponding number of the devices 1. For example, the present invention may be used to "cut" 100 proof whiskey to 86 proof whiskey.

A first modified embodiment in accordance with the present invention is shown in FIG. 10 and is generally designated by the numeral 301. Many of the characteristics of the first modified embodiment 301 are substantially similar to those of the previously described embodiment 1 and will not be reiterated here in detail. The device 301 comprises body means 303, fluid-weight control means 305, and shut off means 307.

The body means 303 generally includes an input portion 313, an intermediate portion 315, and a tail portion 317. The input portion 313 generally has an axially extending input channel 319 for receiving fluid therethrough with a throat 321 leading into a distribution cavity 323. An upper wall 329 of the distribution cavity 323 is configured such that a circularly shaped lip 331 extends downwardly therefrom. At least one branch channel 333, and perhaps a plurality thereof depending on the application, is configured to distribute fluid from the distribution cavity 323 to the container (not shown in FIG. 10), as indicated by the arrows designated by the numeral 335.

The shut off means 307 includes a generally cylindrically shaped shut off cavity 337 generally aligned with the distribution cavity 323. The shut off means 307 also includes a partition arrangement 339 configured to substantially separate the distribution cavity 323 from the shut off cavity 337. The partition arrangement 339 includes a layer 345 secured to a partition wall 347, such as by a rivet 349 or other suitable device, as shown in FIG. 10. The layer 345 and the partition wall 347 each have a generally circular plan profile.

The rivet 349 has a port 351 axially therethrough. The diametric dimension of the port 351 is substantially smaller than the transverse dimensions of each of the throat 321 and the cross-sectional areas available for fluid flow through the branch channels 333. As a result, the volume of fluid flowing through the port 351 is minimal in comparison to the volume of fluid flowing through the branch channels 333.

The layer 345 is generally constructed of resilient, flexible material, such as fabricized rubber or other suitable material, for example, such that as the partition wall 347 is displaced axially by a compression-type spring 353 and fluid pressure in the shut off cavity 337 to cause the layer 345 to abuttingly engage the lip 331 as described herein, fluid is prevented from being distributed from the input channel 319 to the distribution cavity 323 and the branch channels 333. The partition wall 347 is configured such that as the pressure of fluid within the shut off cavity 337 is substantially less than the pressure of fluid within the distribution cavity 323, the layer 345 will be spaced apart from the lip 331, sometimes referred to herein as an open configuration 355, as shown in FIG. 10. The partition wall 347 and the spring 353 are further configured whereby the layer 345 is not spaced apart from the lip 331 as the fluid pressure within the shut off cavity 337 approaches the fluid pressure within the distribution cavity 323 but, instead, is displaced upwardly to establish the aforesaid abutting engagement with the lip 331, sometimes referred to herein as a closed configuration.

The adjacent transverse dimensions of the shut off cavity 337 and the distribution cavity 323 are substantially similar but are substantially greater than the transverse dimension of the throat 321. Therefore, as the layer 345 bears against the lip 331, the upwardly directed force of the fluid in the shut off cavity 337 maintaining the abutting engagement therebetween is substantially greater than the downwardly directed force of the fluid in the throat 321, unless the fluid is vented from the shut off cavity 337, such as through a bleed port 357.

In other words, the compression spring 353 assists with forcing the layer 345 against the lip 331 as the device 301 assumes the closed configuration. The spring constant of the spring 353, however, must be such that the spacing relation between the layer 345 and the lip 331 can operably assume the open configuration 355 as the fluid pressure in the shut off cavity 337 is substantially less than the fluid pressure in the distribution cavity 323. The effective cross-sectional area of the partition arrangement 339 exposed to the shut off cavity 337 is substantially greater than the cross-sectional area of the throat 321 opposing the shut off cavity 337. Thus, as the layer 345 bears against the lip 331, the upwardly directed force of the fluid in the shut off cavity 337 maintaining the abutting engagement therebetween is substantially greater than the downwardly directed force of the fluid in the throat 321, unless the fluid is vented through the control bleed port 357, which occurs while the shut off means 307 permits introduction of fluid into the container 327.

The shut off means 307 also includes a control device 361 having a pilot cavity 363 and a pilot valve 365 that is configured, in conjunction with the bleed port 357, to operably prevent fluid flow from the shut off cavity 337 to the pilot cavity 363. The pilot valve 365 includes an adapter 367 and plunger 369, the latter configured to provide a fluid-tight seal 370 with an enlarged portion 371 of the bleed port 357 and to cooperatively establish a fluid-tight seal with the bleed port 357. A sealing mechanism 373, such as an O-ring or other suitable arrangement, similarly provides a fluid-tight seal between the adapter 367 and walls of the pilot cavity 363. A compression-type spring 375 is configured to provide a normally open configuration for the pilot valve 365. Generally, the spring 375 is configured to resist a predetermined upward pressure against the adapter 367 in the range of approximately one-tenth to ten pounds per square inch.

A bypass 377 provides flow communication from the bleed port 357, upstream from the seal 370, to a lower portion of the pilot cavity 363. If desired, a relief valve 379 may be provided to limit the magnitude by which fluid pressure in the pilot cavity 363 may operably exceed the fluid pressure in the container cavity, such as in the range of approximately one to ten pounds/square inch, but greater than the magnitude of pressure required to cause the adapter 367 and the plunger 369 to be upwardly displaced such that the fluid-tight sealing engagement is established by the plunger 369 and the bleed port 357. A channel 380 provides fluid flow communication from a portion 378 of the pilot cavity 363 that is sealed between the sealing mechanisms 370, 373 such that the fluid pressure within the portion 378 is substantially the same as the fluid pressure within the container cavity.

The tail portion 317 has a cylindrically shaped outer wall 381 extending from the intermediate portion 315 and having a tail cavity 383. An orifice arrangement 385 provides fluid flow communication between the pilot cavity 363 and the tail cavity 383. As before, the fluid-weight control means 305 includes a float or displacer 387, which, in conjunction with the orifice arrangement 385, provides a fluid-tight valving arrangement 393 for operably preventing fluid flow from the pilot cavity 363 to the tail cavity 383. One or more ports 389 provide fluid flow communication between the tail cavity 411 and the container cavity.

In an application of the first modified embodiment of the present invention and assuming the container has not assumed a "filled" condition, the fluid from a source flows through the input channel 319 and throat 321, into the distribution cavity 323, and out through the branch channels 333 into the container cavity.

As the fluid so flows into the container cavity, some of the fluid flows through the port 351 into the shut off cavity 337. If there were no outlet for the fluid to escape from the shut off cavity 337, the fluid pressure within the shut off cavity 337 would quickly equalize with the fluid pressure in the distribution cavity 323 and the shut off means 307 would then prevent further introduction of fluid into the container cavity.

Since, however, the pilot valve 365 assumes a normally open configuration, fluid can escape from the shut off cavity 337, namely through the bleed port 357, through the bypass 377 into the pilot cavity 363, into the tail cavity 383 through the orifice arrangement 385, and into the container cavity through the ports 389. The composite flow capacity of the bleed port 357, the bypass 377, the orifice arrangement 385, and the ports 389 is substantially greater than the flow capacity of the port 351 through the rivet 349 such that the fluid pressure within the shut off cavity 337 is generally substantially less than the fluid pressure within the distribution cavity 323.

As the fluid-tight sealing engagement of the valving arrangement 393 is established by the displacer 387 as hereinbefore described, fluid flow through the orifice arrangement 385 is prevented. As a result, fluid pressure in the shut off cavity 337 increases and, due to the fluid flow through the bypass 377, fluid pressure in the lower portion of the pilot cavity 363 also increases.

As the fluid pressure in the lower portion of the pilot cavity 363 increases, the adapter 367 is forced upwardly against the spring 375. As the pressure continues to increase in the pilot cavity 363, the adapter 367 is forced farther upwardly until the plunger 369 establishes a fluid-tight sealing engagement with the bleed port 357, whereupon additional fluid is prevented from escaping from the shut off cavity 337. As a result, fluid pressure in the shut off cavity 337 rapidly approaches the fluid pressure in the distribution cavity 323, whereupon the layer 345 is forced against the lip 331 preventing fluid flow through the input channel 319 and the branch channels 333.

A second modified embodiment in accordance with the present invention is shown in FIGS. 11 and 12 and is generally designated by the numeral 401. Many of the characteristics of the second modified embodiment 401 are substantially similar to those of the previously described embodiments 1 and 301 and will not be reiterated here in detail. The device 401 comprises body means 403, fluid-weight control means 405, and shut off means 407. The body means 403 generally includes an input portion 413, an intermediate portion 415, and a tail portion 417. The input portion 413 generally has an axially extending input channel 419 for receiving fluid therethrough with a throat 421 leading into a distribution cavity 423. An upper wall 429 of the distribution cavity 423 has a generally conically shaped configuration, as suggested in FIG. 11. A sealing mechanism 431, such as an O-ring or other suitable arrangement, may be mounted to the upper wall 429 to operably establish a fluid-tight sealing engagement between the upper wall 429 and a tapered edge 450. It is to be understood that the O-ring 431 may be mounted either to the upper wall 429 (as shown) or to the tapered edge 450. At least one branch channel 433, and perhaps a plurality thereof depending on the application, is configured to distribute fluid from the distribution cavity 423 to the container (not shown in FIG. 11), as indicated by the arrows designated by the numeral 435.

The shut off means 407 includes a shut off cavity 437 and a partition or thimble arrangement 439 configured to substantially separate the distribution cavity 423 from the shut off cavity 437. The shut off cavity 437 has a "bell" shaped cross-sectional configuration with a sloping wall portion 441, as shown in FIG. 11. The partition arrangement 439 has a partition wall 447 with a port 451 axially therethrough, the tapered edge 450, and a flared portion 452. The diametric dimension of the port 451 is substantially smaller than the transverse dimensions of each of the throat 421 and the cross-sectional areas available for fluid flow through the branch channels 433. As a result, the volume of fluid flowing through the port 451 is minimal in comparison to the volume of fluid flowing through the branch channels 433.

The partition arrangement 439 is mounted such that it is slidably displaceable axially by a compression-type spring 453 and by fluid pressure in the shut off cavity 437 to cause the fluid-tight sealing engagement to be established by the O-ring 429 and to thereby prevent fluid from being distributed from the input channel 419 to the distribution cavity 423 and the branch channels 433. An O-ring 454 prevents fluid flow around the partition arrangement 439 from the distribution cavity 423 to the shut off cavity 437.

The partition wall 447 is configured such that as the pressure of fluid within the shut off cavity 437 is substantially less than the pressure of fluid within the distribution cavity 423, the tapered edge 450 will be spaced apart from the upper wall 429 such that the fluid-tight sealing engagement is not established therebetween by the O-ring 429, sometimes referred to herein as an open configuration 455, as shown in FIG. 11. The partition wall 447 and the spring 453 are further configured whereby the tapered edge 450 is spaced in close proximity to the upper wall 425 such that a fluid-tight sealing engagement is established therebetween as the fluid pressure within the shut off cavity 437 approaches the fluid pressure within the distribution cavity 423, sometimes referred to herein as a closed configuration.

The transverse dimensions of the shut off cavity 437 and the distribution cavity 423 are substantially greater than the transverse dimension of the throat 421. Therefore, as the tapered edge 450 bears against the O-ring 431, the upwardly directed force of the fluid in the shut off cavity 437 maintaining the abutting engagement therebetween is substantially greater than the downwardly directed force of the fluid in the throat 421 unless the fluid is vented from the shut off cavity 437, such as through a bleed port 457.

In other words, the compression spring 453 assists with establishing the fluid-tight sealing engagement between the upper wall 429 and the tapered edge 450 as the device 401 assumes the closed configuration. The spring constant of the spring 453, however, must be such that the spacing relationship between the tapered edge 450 and the upper wall 429 can operably assume the open configuration 455 as the fluid pressure in the shut off cavity 437 is substantially less than the fluid pressure in the distribution cavity 423. The effective cross-sectional area of the partition arrangement 439 exposed to the shut off cavity 437 is substantially greater than the cross-sectional area of the throat 421 opposing the shut off cavity 437. Thus, as the tapered edge 450 bears against the O-ring 431, the upwardly directed force of the fluid in the shut off cavity 437 maintaining the abutting engagement therebetween is substantially greater than the downwardly directed force of the fluid in the throat 421, unless the fluid is vented through the port 451 which occurs while the shut off means 407 permits introduction of fluid into the container.

The shut off means 407 also includes a control device 461 having valves 464, 466 that are configured to operably prevent fluid flow from the shut off cavity 437 as the device 401 assumes a closed configuration wherein fluid is prevented from being introduced into the container cavity. The valve 464 includes a valve 469 to provide a fluid tight sealing engagement with an orifice 471; and the valve 466 includes a valving arrangement to simultaneously provide a fluid-tight sealing engagement with an orifice 473. The orifices 471, 473 generally have substantially identical cross-sectional areas and are connected by channels to the shut off cavity 437, the container cavity, and a tail cavity 479, such as by channels 485, 487, 489, as shown in FIG. 11. The valve 469 and an adapter 491 of a displacer 477 are adjustably connected to a threaded rod 493.

An alternative arrangement of the second modified embodiment 401 is shown in FIG. 12 wherein the control device 461 of the shut off means 407 also includes a cap 462 having a pilot cavity 463 therein. An orifice 470 permits the threaded rod 493 to be extended therethrough to threadedly receive a adapter 472 thereon. A compression-type spring 475, in conjunction with the adapter 472, is configured to partially offset the weight of the displacer 477, as hereinbefore described, such that the displacer 477 becomes buoyant as the container contains the desired weight of fluid. As before, if the container is tilted from its normal upright operating orientation, the spring 475 will not be resisted by gravitational forces of the displacer 477 to the extent that it would be if the container has such normal upright orientation and, therefore, will responsively prevent introduction of additional fluid into the container. In other words, the spring situated at the bottom of the displacer 477 as hereinbefore described may be replaced by the spring 475.

In an application of the second modified embodiment of the present invention and assuming the container has not assumed a "filled" condition, the fluid from a source flows through the input channel 419 and the throat 421, into the distribution cavity 423, and out through the branch channels 433 into the container cavity.

As the fluid so flows into the container cavity, some of the fluid flows through the port 451 into the shut off cavity 437. If there were no outlet for the fluid to escape from the shut off cavity 437, the fluid pressure within the shut off cavity 437 would quickly equalize with the fluid pressure in the distribution cavity 423 and the shut off means 407 would then prevent introduction of fluid into the container cavity.

Until the displacer 477 becomes buoyant, fluid can escape from the shut off cavity 437, namely through the channels 485, 487, 489 into the tail cavity 479 and the container cavity. The composite flow capacity of the channels 485, 487, 489 is substantially greater than the flow capacity of the port 451 such that the fluid pressure within the shut off cavity 437 is generally substantially less than the fluid pressure within the distribution cavity 423.

As the fluid-tight sealing engagement of the valving arrangement 466 is established by the displacer 477, fluid flow through the orifice arrangement 473 is prevented. In addition, fluid flow through the valves 464, 466 is also prevented. As the pressure continues to increase in the shut off cavity 437 such that the fluid pressure in the shut off cavity 437 approaches the fluid pressure in the distribution cavity 423, the partition arrangement 439 is forced upwardly establishing a fluid-tight sealing engagement between the upper wall 429 and the tapered edge 450, preventing fluid flow through the input channel 419 and the branch channels 433.

It should be noted that since the orifices 471, 473 have substantially identical cross-sectional areas, the upward force directed by the fluid along the rod 493 against the valve 466 is substantially equal to the downward force directed by the fluid along the rod 493 against the valve 468. Therefore, any tendency by the fluid pressure to influence the buoyancy characteristic provided by the displacer 477 is essentially canceled.

A third modified embodiment in accordance with the present invention is shown in FIGS. 13 through 16 and is generally designated by the numeral 501. Many of the characteristics of the third modified embodiment 501 are substantially similar to those of the embodiments previously described herein and will not be reiterated here in detail. One variation of the device 501, shown in FIGS. 13 and 14, comprises body means 503, fluid-weight control means 505, and shut off means 507, as partially shown in FIGS. 13 and 14. The body means 503 generally includes an intermediate portion 515 and a tail portion 517 having a tail cavity 519. The shut off means 507 includes a shut off cavity 537 substantially separated from a distribution cavity (not shown in FIGS. 13 through 16) as hereinbefore described. A channel 541 extends axially from the shut off cavity 537 to the tail cavity 519.

The shut off means 507 also includes a control device 551 having an inverted cap 561 with a top wall 562 and substantially vertical side walls 564 enclosing a cavity 563 therein. The horizontal cross-section of the cap 561 may be square, circular, or other suitable configuration. The cap 561 is attached such that a fluid-tight seal is established about the channel 541 at a lower extremity of the side walls 564 of the cap 561. Also, the channel 541 provides fluid flow communication between the cavity 563 and the tail cavity 519. A rod 563, connected to a displacer 567, extends upwardly from the displacer 567 through the channel 541 and into the cavity 563.

The shut off means 507 includes at least one valve 574, such as a ball 577 configured to sealingly mate with an orifice 579 to operably form a fluid-tight sealing engagement therebetween. For example, the shut off means 507 may have a configuration wherein the side walls 564 of the cap 561 has a square or rectangular horizontal cross-sectional configuration and the orifice 579 is positioned in a planar side thereof, the orifice 579 having a countersink-type profile; or a configuration wherein the cap 561 has a circular horizontal cross-sectional configuration, the sides of the cap 561 are a portion of a tube, and the orifice 579 is correspondingly conformed to provide the desired fluid-tight sealing arrangement.

The rod 563 has an enlarged portion 581, that is positioned alongside the balls 577 as the displacer 567 indicates a non-"filled" condition, thereby preventing the balls 577 from forming the fluid-tight sealing engagement with the respective orifices 579, and that is elevated above the balls 577 as the displacer 567 becomes buoyant indicating a "filled" condition, thereby allowing the balls 577 to form the fluid-tight sealing engagement with the respective orifices 579.

One of the devices 501 having two of the valves 574 is shown in FIGS. 13 through 16. In the configuration shown in FIGS. 13 and 14, a bottom surface 585 of the shut off cavity 537 is shown sloping toward the cap 561 in order for the balls 577 to realize a slight gravitational urge toward formation of the sealing engagement with the respective orifices 579. An open configuration thereof is shown in FIG. 13, and a closed configuration thereof is shown in FIG. 14.

A different configuration of the device 501 is symbolically shown in FIGS. 15 and 16 wherein a weak compression-type spring 587 is utilized to assist with formation of the sealing engagement between the balls 577 and the orifices 579. A closed configuration thereof is shown in FIG. 15, and an open configuration thereof is shown in FIG. 16.

In an application of the third modified embodiment of the present invention and assuming the container has not assumed a "filled" condition, fluid is applied to the device 501 from a source as aforesaid. Since the container has not assumed a "filled" condition, the displacer 567 is not buoyant, and the enlarged portion 581 is spaced alongside the balls 577 such that the valves 574 assume the open configuration, with fluid flow as indicated by the arrows designated by the numeral 589 in FIGS. 13 and 16. As a result, fluid flowing into the shut off cavity 537 as aforesaid also flows into the tail cavity 519, thereby maintaining the fluid pressure within the shut off cavity 537 at a pressure that is substantially less than the pressure at which fluid is being introduced into the container.

As the displacer 567 becomes buoyant, the enlarged portion 581 is elevated to a position wherein the enlarged portion 581 no longer interferes with the balls 577. As a result, the balls 577 are displaced inwardly, as indicated by the arrows designated by the numeral 591 in FIGS. 14 and 15, such that each of the valves 574 assume the closed configuration, thereby establishing the desired fluid-tight seal. There then being no outlet for fluid to escape from the shut off cavity 537, the fluid pressure within the shut off cavity 537 quickly approaches the pressure of the fluid being introduced into the container cavity, causing the shut off means 507 to prevent further introduction of fluid into the container cavity as aforesaid.

Figure 17:
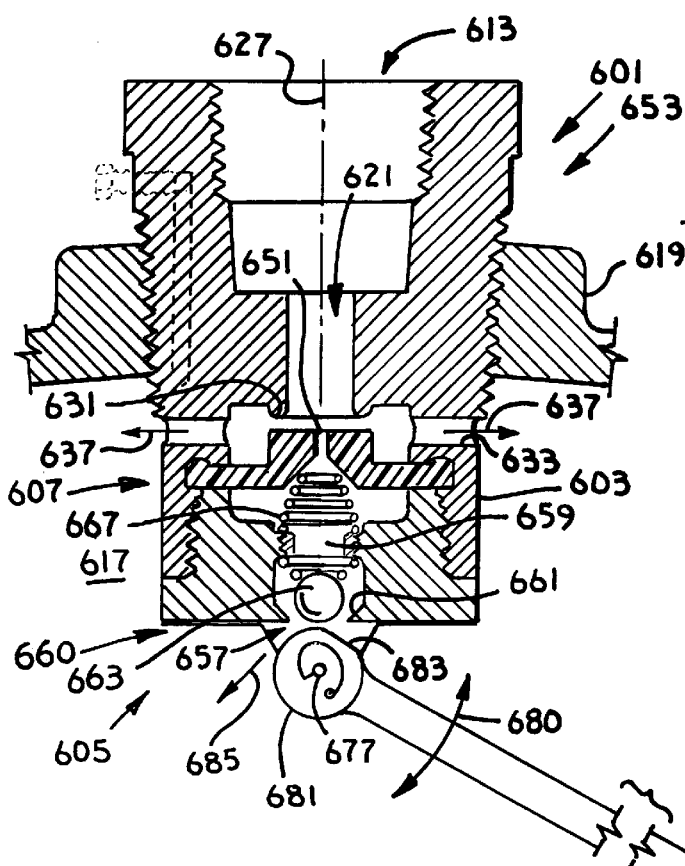
FIG. 17 is a fragmentary, cross-sectional view of a fourth modified embodiment of the fluid-weight control device, similar in scale to that shown in FIG. 15, showing the device with a pivotally mounted displacer and in an opened configuration, according to the present invention.
Figure 18:
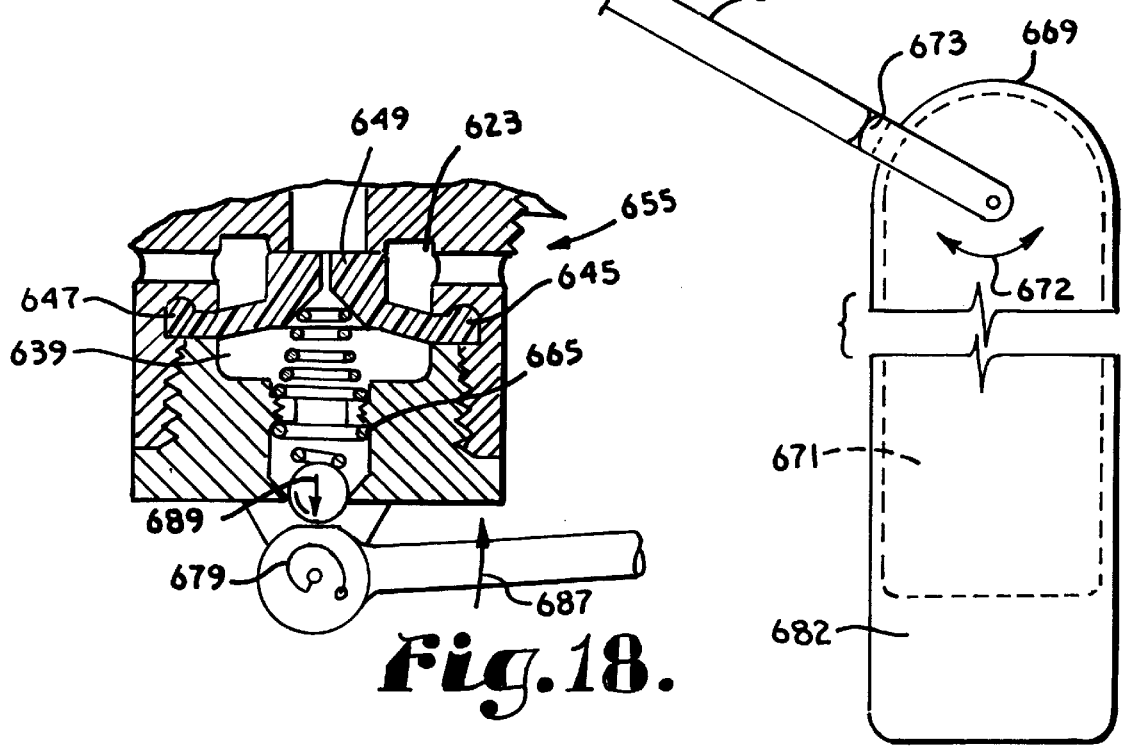
FIG. 18 is a fragmentary, cross-sectional view of the fourth modified embodiment of the fluid-weight control device, similar to that shown in FIG. 17 but showing the device in a closed configuration.

A fourth modified embodiment in accordance with the present invention is shown in FIGS. 17 and 18 and is generally designated by the numeral 601. Many of the characteristics of the fourth modified embodiment 601 are substantially similar to various of the embodiments previously described herein and will not be reiterated here in detail. The device 601 comprises body means 603, fluid-weight control means 605, and shut off means 607.

The device 601 generally has an axially extending input channel 613 for receiving fluid therethrough for introduction into a container cavity 617 of the container 619, and a throat 621 leading into a distribution cavity 623, which is generally cylindrically shaped and arranged coaxially about the axis 627. An upper wall 629 of the distribution cavity 623 is configured such that a circularly shaped lip 631 extends downwardly therefrom. At least one branch channel 633 is configured to distribute fluid from the input channel 613 to the container cavity 617, as indicated by the arrows designated by the numeral 637 in FIG. 17.

The shut off means 607 includes a generally cylindrically shaped shut off cavity 639 aligned with the distribution cavity 623. The shut off means 607 also includes a partition arrangement 641 configured to substantially separate the distribution cavity 623 from the shut off cavity 639. The partition arrangement 641 includes a partition wall or diaphragm 643 spaced generally between the distribution cavity 623 and the shut off cavity 639. The partition wall 643 has a generally circular shape, with an enlarged peripheral edge 645 captured in a circularly shaped groove 647. The partition wall 643 also has a thickened hub 649 extending toward the lip 631, as shown in FIG. 17.

The partition wall 643 has a port 651 axially therethrough. The diametric dimension of the port 651 is substantially smaller than each of the transverse dimensions of the throat 621 and the cross-sectional areas available for fluid flow through the branch channels 633. As a result, the volume of fluid flowing through the port 651 is minimal in comparison to the volume of fluid flowing through the branch channels 633.

The partition wall 643 is generally constructed of resilient, flexible material, such as fabricized rubber or other suitable material for example, such that the hub 649 thereof can be flexed upwardly to abuttingly engage the lip 631 to thereby prevent fluid from being distributed from the input channel 613 to the distribution cavity 623 and the branch channels 633. The partition wall 643 is configured such that as the pressure of fluid within the shut off cavity 639 is substantially less than the pressure of fluid within the distribution cavity 623, the hub 649 will be spaced apart from the lip 631, sometimes referred to herein as an opened configuration 653, as shown in FIG. 17. The partition wall 643 is further configured whereby the hub 649 is not spaced apart from the lip 631 as the pressure of fluid within the shut off cavity 639 approaches the pressure of fluid within the distribution cavity 623 but, instead, is flexed upwardly to establish the aforesaid abutting engagement with the lip 631, sometimes referred to herein as a closed configuration 655, as shown in FIG. 18.

The adjacent transverse dimensions of the shut off cavity 639 and the distribution cavity 623 are substantially similar but are substantially greater than the transverse dimension of the throat 621. Therefore, as the hub 649 bears against the lip 631, the upwardly directed fluid force in the shut off cavity 639 maintaining the abutting engagement therebetween is substantially greater than the downwardly directed force of the fluid in the throat 621, unless the fluid in the shut off cavity 639 is vented through a control port 657, introduction of fluid into the container 619 is permitted by the shut off means 607 as described herein.

The shut off means 607 also includes a control cavity 659 extending generally axially from the shut off cavity 639 to the control port 657, such that a valving arrangement 660, such as a conically or spherically shaped depression or other suitable configuration, is formed whereby a ball 663 may be spaced within the control cavity 659 to operably form a fluid-tight sealing engagement with the seat 661. An optional compression spring 665 may be used to assist with forming the sealing engagement between the ball 663 and the seat 661.

A compression spring 667 may also be used to assist with forcing the hub 649 against the lip 631 as the device 601 assumes the closed configuration 655. The spring constant of the spring 667, however, must be such that the spacing relation between the hub 649 and the lip 631 can operably assume the opened configuration 653 as the fluid pressure in the shut off cavity 639 is substantially less than the fluid pressure in the distribution cavity 623.

The area of the diaphragm 643 exposed to the shut off cavity 639 is substantially greater than the cross-sectional area of the throat 621 opposing the shut off cavity 639. Thus, as the hub 649 bears against the lip 631, the upwardly directed fluid force in the shut off cavity 639 maintaining the abutting engagement therebetween is substantially greater than the downwardly directed force of the fluid in the throat 621, unless the fluid in the shut off cavity 639 is vented through the valving arrangement 660, which occurs while the shut off means 607 permits introduction of fluid into the container 619 as described herein.

The fluid-weight control means 605 includes a float or pivotally mounted or lever mounter displacer 669. The displacer 669 is generally constructed of light weight material, such as aluminum, or other suitable material and has a sealed displacer cavity 671 that is dimensioned and configured such that the displacer 669 becomes buoyant as the container 619 contains a weight of fluid that is slightly smaller in magnitude than the weight of fluid predetermined to constitute a "filled" condition for the container 619.

The displacer 669 is pivotally mounted, as indicated by an arrow designated by the numeral 672 in FIG. 17, by a "horseshoe" or clevis arrangement 673 to a displacer arm 675, which, in turn, is pivotally mounted to the body means 603 about a horizontal axis 677. The displacer 669 has a diameter which will permit the displacer to be inserted through an opening in the container 619 for installation purposes, such as less than three-fourths inches; the displacer 669 may have a length in the range of eight to twelve inches for example, or any other suitable length. An optional spring 679 or other suitable arrangement is mounted about the axis 677 and is configured whereby a rotational force exerted by the spring 679 assists the displacer 669 to operably become buoyant as the weight of fluid in the container 619 satisfies a "filled" condition as the container 619 assumes a normal operating orientation. The displacer arm 675 is dimensioned with sufficient length whereby the necessary leverage is generated to accomplish closing of the valving arrangement 660 yet with limited length whereby the swing thereof, as indicated by an arrow designated by the numeral 680, is not hindered by the top, bottom, wall, etc. of the container 619, etc. For example, the displacer arm 675 may have a length in the range of four to six inches, or any other suitable length. The displacer 669 has a weighted bottom 682 to maintain the displacer 669 in an upright orientation, as shown in FIG. 17. A cam 681, rigidly mounted to the displacer arm 675 and having a camming surface 683, cooperatively with the spring 679 and the displacer 669, elevates the ball 663 from the seat 661 as the displacer 669 assumes the opened configuration 653, as shown in FIG. 17, and allows the ball 663 to form the fluid-tight sealing engagement with the seat 661 as the displacer 669 assumes the closed configuration 655. For those applications that do not utilize the optional spring 679, the cam 681 may have a second camming surface similar to the camming surface 683 but oppositely situated therefrom so the displacer arm 675 can rotate either clockwise or counterclockwise about the axis 677 as the displacer 669 becomes buoyant and thereby accomplish the same intended result.

In addition to when the container 619 assumes a "filled" condition, the displacer 669 may also assume the closed configuration 655 when the container 619 has an orientation that differs from an essentially upright position whereby the rotational force provided by the spring 679 exceeds the gravitational weight component of the displacer 669 along the axis 627 whereupon the spring 679 responsively displaces the displacer 669, causing the valving arrangements 660 to establish a fluid-tight sealing engagement as described herein, thereby activating the shut off means 607 and preventing fluid from being introduced into the container cavity 617 as the container 619 is inclined from an essentially upright orientation.

In an application of the present invention wherein a fluid or fluids are to be introduced into the container 619, the container 619 is placed in an upright orientation. A nozzle (not shown) from a source of fluid is attached to the device 601. Assuming the container 619 has not assumed a "filled" condition, the fluid from the source flows through the input channel 613, into the distribution cavity 623, and out through the branch channels 633 into the container cavity 617.

As the fluid flows from the source to the container cavity 617, some of the fluid flows through the port 651 into the shut off cavity 639 and the control cavity 659. If there were no outlet other than the port 651 for the fluid to escape from the shut off cavity 639 and the control cavity 659, the pressure of the fluid within the shut off cavity 639 and the control cavity 659 would quickly approach the pressure of the fluid in the distribution cavity 623 and the shut off means 607 would then prevent introduction of fluid into the container cavity 617.

There is, however, another outlet for the fluid to escape from the shut off cavity 639 and the control cavity 659, namely through the control port 657. Fluid flowing through the valving arrangement 660 readily flows around the ball 663 and through the control port 657, as indicated by the arrow designated by the numeral 685 in FIG. 17. The flow capacity of the valving arrangement 660 in the opened configuration 653 is substantially greater than the flow capacity of the port 651 such that the pressure of the fluid within the shut off cavity 639 is generally substantially less than the pressure of the fluid within the distribution cavity 623.

As the container 619 assumes a "filled" condition, the displacer 669 is buoyed upwardly, the displacer arm 675 is rotated such that the camming surface 683 is spaced adjacent to the seat 661 to prevent the cam 681 from further interfering with downward movement of the ball 663 as indicated by the arrow designated by the arrow designated by the numeral 687 in FIG. 18, and the ball 663 is displaced into fluid-tight sealing engagement with the seat 661, as indicated by the arrow designated by the numeral 689.

As the fluid-tight sealing engagement of the valving arrangement 660 prevents fluid flow therethrough, the fluid pressure in the seat cavity 659 and shut off cavity 639 rapidly approaches the fluid pressure in the distribution cavity 623, whereupon the hub 649 is forced upwardly against the lip 631, preventing fluid flow through the input channel 613 and the branch channels 633.

A fifth modified embodiment in accordance with the present invention is shown in FIGS. 19 and 20 and is generally designated by the numeral 801. Many of the characteristics of the fifth modified embodiment 801 are substantially similar to various of the embodiments previously described herein and will not be reiterated here in detail. The device 801 comprises body means 803, fluid-weight control means 805, and shut off means 807.

The body means 803 generally has an axially extending input channel 809 for receiving fluid therethrough with a throat 811 leading into a distribution cavity 813. An upper wall 815 of the distribution cavity 813 is configured such that a circularly shaped lip 817 extends downwardly therefrom. At least one branch channel 819, and perhaps a plurality thereof depending on the application, is configured to distribute fluid from the distribution cavity 813 to the container (not shown in FIGS. 19 and 20), as indicated by the arrows designated by the numeral 821.

The shut off means 807 includes a generally cylindrically shaped shut off cavity 823 generally aligned with the distribution cavity 813. The shut off means 807 also includes a partition arrangement 825 configured to substantially separate the distribution cavity 813 from the shut off cavity 823. The partition arrangement 825 includes a layer 827 secured to a partition wall 829, such as by a rivet 831 or other suitable device, as shown in FIG. 19. The layer 827 and the partition wall 829 each have a generally circular plan profile.

The rivet 831 has a port 833 axially therethrough. The diametric dimension of the port 833 is substantially smaller than the transverse dimensions of each of the throat 811 and the cross-sectional areas available for fluid flow through the branch channels 819. As a result, the volume of fluid flowing through the port 833 is minimal in comparison to the volume of fluid flowing through the branch channels 819.

The layer 827 is generally constructed of resilient, flexible material, such as fabricized rubber or other suitable material, for example, such that as the partition wall 829 is displaced axially by a compression-type spring 835 and fluid pressure in the shut off cavity 823 to cause the layer 827 to abuttingly engage the lip 817 as described herein, fluid is prevented from being distributed from the input channel 809 to the distribution cavity 813 and the branch channels 819. The partition wall 829 is configured such that, as the pressure of fluid within the shut off cavity 823 is substantially less than the pressure of fluid within the distribution cavity 813, the layer 827 will be spaced apart from the lip 817, sometimes referred to herein as an open configuration 837, as shown in FIG. 19. The partition wall 829 and the spring 835 are further configured whereby the layer 827 is not spaced apart from the lip 817 as the fluid pressure within the shut off cavity 823 approaches the fluid pressure within the distribution cavity 813 but, instead, is displaced upwardly to establish the aforesaid abutting engagement with the lip 817, sometimes referred to herein as a closed configuration 839, as shown in FIG. 20.

The adjacent transverse dimensions of the shut off cavity 823 and the distribution cavity 813 are substantially similar but are substantially greater than the transverse dimension of the throat 811. Therefore, as the layer 827 bears against the lip 817, the upwardly directed force of the fluid in the shut off cavity 823 maintaining the abutting engagement therebetween is substantially greater than the downwardly directed force of the fluid in the throat 811 unless the fluid is vented from the shut off cavity 823, such as through a control port 841.

In other words, the compression spring 835 assists with forcing the layer 827 against the lip 817 as the device 801 assumes the closed configuration 839. The spring constant of the spring 835, however, must be such that the spacing relation between the layer 827 and the lip 817 can operably assume the open configuration 837 as the fluid pressure in the shut off cavity 823 is substantially less than the fluid pressure in the distribution cavity 813. The effective cross-sectional area of the partition arrangement 825 exposed to the shut off cavity 823 is substantially greater than the cross-sectional area of the throat 811 opposing the shut off cavity 823. Thus, as the layer 827 bears against the lip 817, the upwardly directed force of the fluid in the shut off cavity 823 maintaining the abutting engagement therebetween is substantially greater than the downwardly directed force of the fluid in the throat 811 unless the fluid is vented through the control bleed port 841, which occurs while the shut off means 807 permits introduction of fluid into the container.

The shut off means 807 also includes a control device 843 having a pilot cavity 845 and a pilot valve 847 that is configured, in conjunction with the bleed port 841, to operably prevent fluid flow from the shut off cavity 823 to the pilot cavity 845. The pilot valve 847 includes an adapter 849 and plunger 851, the latter configured to provide a fluid-tight seal 853 with an enlarged portion 855 of the bleed port 841 and to cooperatively establish a fluid-tight seal with the bleed port 841. A sealing mechanism 857, such as an O-ring or other suitable arrangement, similarly provides a fluid-tight seal between the adapter 849 and walls of the pilot cavity 845. A compression-type spring 859 is configured to provide a normally open configuration for the pilot valve 847. Generally, the spring 859 is configured to resist a predetermined upward pressure against the adapter 849 in the range of approximately one-tenth to ten pounds per square inch.

A bypass 861 provides flow communication from the bleed port 841, upstream from the seal 853, to a lower portion of the pilot cavity 845. A channel 863 provides fluid flow communication from a portion 865 of the pilot cavity 845 that is sealed between the sealing mechanisms 853, 857 such that the fluid pressure within the portion 865 is substantially the same as the fluid pressure within the container cavity.

The fluid weight means 805 also includes a control cavity 867 extending generally axially from the pilot cavity 845 to a valving arrangement 869, such as a conically or spherically shaped seat or depression 871 or other suitable configuration in conjunction with a ball 873 spaced within the control cavity 867 and configured to operably form a fluid-tight sealing engagement with the seat 871. An optional compression spring 875 may be used to assist with forming the sealing engagement between the ball 873 and the seat 871.

The fluid-weight control means 805 also includes a float or pivotally mounted or lever mounter displacer 877. Again, the displacer 877 is generally constructed of light weight material, such as aluminum, or other suitable material and has a sealed displacer cavity 879 that is dimensioned and configured such that the displacer 877 becomes buoyant as the container contains a weight of fluid that is slightly smaller in magnitude than the weight of fluid predetermined to constitute a "filled" condition for the container.

The displacer 879 is pivotally mounted by a "horseshoe" or clevis arrangement 881 to a displacer arm 883, which, in turn, is pivotally mounted to the body means 803 about a horizontal axis 885. An optional spring 887 or other suitable arrangement is mounted about the axis 885 and is configured whereby a rotational force exerted by the spring 887 assists the displacer 877 to operably become buoyant as the weight of fluid in the container satisfies a "filled" condition as the container assumes a normal operating orientation. A cam 889, rigidly mounted to the displacer arm 883 and having a camming surface 891, cooperatively with the spring 887 and the displacer 877, elevates the ball 873 from the seat 871 as the displacer 877 assumes the opened configuration 837, as shown in FIG. 19, and allows the ball 873 to form the fluid-tight sealing engagement with the seat 871 as the displacer 877 assumes the closed configuration 839.

And, again, in addition to when the container assumes a "filled" condition, the displacer 877 may also assume the closed configuration 839 when the container has an orientation that differs from an essentially upright position whereby the rotational force provided by the spring 887 exceeds the gravitational weight component of the displacer 877 along a longitudinal axis 891 of the device 801 whereupon the spring 887 responsively displaces the displacer 877, causing the valving arrangements 869 to establish a fluid-tight sealing engagement as described herein, thereby activating the shut off means 807 and preventing fluid from being introduced into the container cavity as the container is inclined from an essentially upright orientation.

In an application of the fifth modified embodiment of the present invention and assuming the container has not assumed a "filled" condition, the fluid from a source flows through the input channel 809 and throat 811, into the distribution cavity 813, and out through the branch channels 819 into the container cavity.

As the fluid so flows into the container cavity, some of the fluid flows through the port 833 into the shut off cavity 823. If there were no outlet for the fluid to escape from the shut off cavity 823, the fluid pressure within the shut off cavity 823 would quickly equalize with the fluid pressure in the distribution cavity 813 and the shut off means 807 would then prevent further introduction of fluid into the container cavity.

Since, however, the pilot valve 839 assumes a normally open configuration, fluid can escape from the shut off cavity 823, namely through the bleed port 841, through the bypass 861 into the pilot cavity 845, and through the valving arrangement 869. The composite flow capacity of the bleed port 841, the bypass 861, and the valving arrangement 869, is substantially greater than the flow capacity of the port 833 through the rivet 831 such that the fluid pressure within the shut off cavity 823 is generally substantially less than the fluid pressure within the distribution cavity 813.

As the fluid-tight sealing engagement of the valving arrangement 869 is established by the displacer 877 as hereinbefore described, fluid flow through the valving arrangement 869 is prevented. As a result, fluid pressure in the shut off cavity 823 increases and, due to the fluid flow through the bypass 861, fluid pressure in the lower portion of the pilot cavity 845 also increases.

As the fluid pressure in the lower portion of the pilot cavity 845 increases, the adapter 849 is forced upwardly against the spring 859. As the pressure continues to increase in the pilot cavity 845, the adapter 849 is forced farther upwardly until the plunger 851 establishes a fluid-tight sealing engagement with the bleed port 841, whereupon additional fluid is prevented from escaping from the shut off cavity 823. As a result, fluid pressure in the shut off cavity 823 rapidly approaches the fluid pressure in the distribution cavity 813, whereupon the layer 827 is forced against the lip 817 preventing fluid flow through the input channel 809 and the branch channels 819.

It is to be understood that while certain forms of the present invention have been illustrated and described herein, it is not to be limited to the specific forms or arrangement of parts described and shown.

What is claimed and desired to be secured by Letters Patent is as follows:

1. A device for introducing fluid into a container, comprising:
    (a) body means configured to be mounted to the container;
    (b) detector means, connected to said body means, configured to detect a "filled" condition of the container based on a desired weight of a fluid contained in the container; said detector means including a pivotally mounted displacer configured such that buoyancy forces thereof slightly exceed gravitational forces thereof as the container assumes a normal operating orientation and assumes said "filled" condition; and
    (c) shut off means, responsive to said detector means, configured to automatically prevent introduction of additional fluid into the container as said "filled" condition of the container is detected by said detector means.

2. The device according to claim 1, wherein said detector means includes a resilient member configured to partially offset the weight of said displacer.

3. The device according to claim 1, wherein said shut off means is configured to also prevent introduction of fluid into the container as the container is not assuming a normal operating orientation even though the container may not have assumed said "filled" condition.

4. The device according to claim 1, wherein said detector means is configured such that said device is substantially independent of the temperature of the fluid contained in the container.

5. The device according to claim 1, wherein said detector means is configured such that said device is substantially independent of the specific gravity of fluid contained in the container.

6. The device according to claim 1, wherein said detector means is configured such that said device is substantially independent of inertial effects induced in said detector means in an attempt to introduce additional fluid into the container as the container assumes said "filled" condition.

7. The device according to claim 1, wherein said shut off means includes a pilot valve arrangement configured to cause said shut off means to operably assume a closed configuration, wherein said pilot valve arrangement is configured to be activated by a fluid pressure that is substantially less than the pressure at which fluid is being introduced into the container.

8. An apparatus, comprising:
    (a) a container having a cavity; and
    (b) fluid-weight control means configured to control introduction of a weight of fluid into said cavity wherein said weight may be up to, but is automatically prevented from exceeding, a predetermined weight of the fluid and wherein said fluid-weight control means includes detection means includes a pivotally mounted displacer configured to detect whether said cavity substantially contains said predetermined weight of the fluid as said container assumes an upright orientation.

9. The apparatus according to claim 8, wherein said detection means further includes a resilient member configured to operably partially offset the weight of said pivotally mounted displacer.

10. The apparatus according to claim 9, wherein said resilient member and said pivotally mounted displacer are cooperatively adapted for use with a particular composition of fluid to be introduced into said container.

11. The apparatus according to claim 8, wherein said pivotally mounted displacer is configured, in conjunction with said orifice arrangement, to operably activate said fluid-weight control means as said container assumes a "filled" condition.

12. The apparatus according to claim 8, wherein said fluid-weight control means is also configured to prevent introduction of fluid into said cavity as said container assumes a non-upright orientation even though said cavity may contain less weight of the fluid than said predetermined weight of the fluid.

13. The apparatus according to claim 8, wherein said fluid-weight control means is configured to be substantially independent of the temperature of the fluid contained in said cavity.

14. The apparatus according to claim 8, wherein said fluid-weight control means is configured to be substantially independent of the composition of the fluid contained in said cavity.

15. The apparatus according to claim 8, wherein said fluid-weight control means is configured to be substantially independent of inertial effects induced in said detection means in an attempt to introduce additional fluid into said container as said cavity substantially contains said predetermined weight of the fluid.

16. The apparatus according to claim 8, wherein said fluid-weight control means includes a pilot valve arrangement configured to cause said shut off means to operably assume a closed configuration, and wherein said pilot valve arrangement is activated by a fluid pressure that is substantially less than the pressure at which fluid is being introduced into the container.

17. A method of preventing overfilling of a container with fluid, said method comprising the steps of:
   (a) introducing the fluid into the container through a device installed through a wall of the container;
   (b) using said device, cooperatively by means of a pivotally mounted displacer thereof wherein said displacer is configured such that buoyancy forces thereof slightly exceed gravitational forces thereof as the fluid contained in the container reaches a predetermined weight of the fluid, to determine whether the container substantially contains said predetermined weight of the fluid; and
   (c) further using said device to automatically prevent introduction of additional fluid into the container upon determining that the container substantially contains said predetermined weight of the fluid.

* * * * *